United States Patent
Umbehocker et al.

(10) Patent No.: US 7,366,742 B1
(45) Date of Patent: Apr. 29, 2008

(54) SYSTEM AND METHOD FOR DISTRIBUTED DISCOVERY AND MANAGEMENT OF FROZEN IMAGES IN A STORAGE ENVIRONMENT

(75) Inventors: Steven Umbehocker, Mercer Island, WA (US); Tim Naftel, Longmont, CO (US); Shailesh Chaudhari, Pune (IN); Kirk W. Clowser, Dellwood, MN (US); Terence W. Noonan, Vadnais Heights, MN (US); Shishir Asgaonkar, Pune (IN); Gary Philips, Sanford, FL (US); Thomas W. Lanzatella, Minneapolis, MN (US); Elliot J. Murphy, Cocoa, FL (US)

(73) Assignee: Symantec Operating Corporation, Cupertino, CA (US)

( * ) Notice: Subject to any disclaimer, the term of this patent is extended or adjusted under 35 U.S.C. 154(b) by 328 days.

(21) Appl. No.: 10/938,037

(22) Filed: Sep. 10, 2004

(51) Int. Cl.
*G06F 17/30* (2006.01)
*G06F 12/00* (2006.01)

(52) U.S. Cl. .............. 707/204; 707/202; 707/203; 711/161; 711/162; 711/163

(58) Field of Classification Search .............. 707/101, 707/200, 202, 203, 204
See application file for complete search history.

(56) References Cited

U.S. PATENT DOCUMENTS

| | | | | |
|---|---|---|---|---|
| 5,495,607 A | * | 2/1996 | Pisello et al. ............... 707/10 |
| 5,649,196 A | * | 7/1997 | Woodhill et al. ........... 707/204 |
| 5,673,382 A | * | 9/1997 | Cannon et al. ............... 714/6 |
| 5,819,020 A | * | 10/1998 | Beeler, Jr. ................... 714/5 |
| 6,021,415 A | * | 2/2000 | Cannon et al. ............. 707/206 |
| 6,151,602 A | * | 11/2000 | Hejlsberg et al. ............. 707/10 |
| 6,366,987 B1 | * | 4/2002 | Tzelnic et al. ............. 711/162 |
| 6,487,561 B1 | * | 11/2002 | Ofek et al. ................. 707/204 |
| 6,594,744 B1 | | 7/2003 | Humlicek et al. |
| 6,820,099 B1 | | 11/2004 | Huber et al. |
| 6,829,617 B2 | | 12/2004 | Sawdon et al. |
| 6,850,945 B2 | * | 2/2005 | Lanzatella et al. ........ 707/100 |
| 7,069,401 B1 | * | 6/2006 | Noonan et al. ............. 711/162 |
| 2003/0046260 A1 | * | 3/2003 | Satyanarayanan et al. ..... 707/1 |
| 2006/0095698 A1 | * | 5/2006 | Soejima et al. ............. 711/163 |

OTHER PUBLICATIONS

Sinha, Alok. "Client-Server Computing." Jul. 1992. Communications of the ACM. vol. 35, Issue 7. pp. 77-98.*
Zou et al. "A real-time primary-backup replication server." Jun. 1999. vol. 10, No. 6. pp. 533-548.*

(Continued)

*Primary Examiner*—Sam Rimell
*Assistant Examiner*—Alicia M Lewis
(74) *Attorney, Agent, or Firm*—Meyertons Hood Kivlin Kowert & Goetzel, P.C.; B. Noël Kivlin

(57) ABSTRACT

A system for distributed discovery and management of frozen images includes a first and a second computer host, a first and a second frozen image agent and a frozen image server. Each of the first and second frozen image agents may be configured to identify one or more storage hierarchies hosted at a respective computer host, and to provide an encoding representing the identified storage hierarchies to the frozen image server. The frozen image server may be configured to aggregate the encodings provided by the frozen image agents into a system-level storage hierarchy catalog.

23 Claims, 10 Drawing Sheets

OTHER PUBLICATIONS

Cheng, Cisco. "Second Copy 2000." Jun. 17, 2003. http://www.pcmag.com/article2/0,4149,1091151,00.asp.*

Anonymous, "Windows Server 2003 Active Directory Fast Recovery with Volume Shadow Copy Service and Virtual Disk Service", Microsoft Corporation, Aug. 2003, Internet, http://WWW.microsoft.com/windowsserver2003/technologies/activedirectory/W2K3ActDirFastRec.mspx.

Anonymous, "WideSky Storage Resource Management Application Programming Interface", EMC Corporation, Hopkinton, MA, Oct. 2002, Internet, http://www.emc.com/partnersalliances/developers/datasheets/srm_api.pdf.

Anonymous, "SMI-S Brings Compelling Value to Storage Management", Storage Networking Industry Association (SNIA), San Francisco, CA, Sep. 2003, Internet, http://www.snia.org/apps/group_public/download.php/6430/SMI-S%20Brings%20Value%20to%20Storage%20Management%20SMF003%20rev.1.pdf.

Anonymous, W2k3ActDirFastRecov.doc: a document from Microsoft copyright Aug. 2003 related to Volume Shadow Copy Service.

Anonymous, srm_api.pdf: a data sheet from EMC, Dated 2002, pertaining to an API mentioned by the inventor.

Anonymous, SMI-S_Brings_Value_to_Storage_Management_SMF003_rev1pdf: an industry consortium pape copyrighted Sep. 2003, revised Jun. 2004.

* cited by examiner

SYSTEM AND METHOD FOR DISTRIBUTED DISCOVERY AND MANAGEMENT OF FROZEN IMAGES IN A STORAGE ENVIRONMENT

BACKGROUND OF THE INVENTION

1. Field of the Invention

This invention relates to computer systems and, more particularly, to the management of snapshots or frozen images within distributed storage environments.

2. Description of the Related Art

Many business organizations and governmental entities rely upon applications that access large amounts of data, often exceeding a terabyte or more of data, for mission-critical applications. Often such data is stored on many different storage devices, which may be heterogeneous in nature, including many different types of devices from many different manufacturers. The storage devices may be physically distributed across one or more data centers, and may be accessible by a combination of networks such as local area networks (LANs), wide area networks (WANs), storage area networks (SANs) and the like.

Configuring individual applications that consume data, or application server systems that host such applications, to recognize and directly interact with each different storage device that may possibly be encountered in a heterogeneous storage environment will be increasingly difficult as the environment scales in size and complexity. Therefore, in some storage environments, specialized storage management software and hardware may be used to provide a more uniform storage model to storage consumers. Such software and hardware may also be configured to add storage features not present in individual storage devices to the storage model. Features to increase fault tolerance, such as data mirroring or data parity, as well as features to increase data access performance, such as disk striping, may be implemented in the storage model via hardware or software.

Among the advanced storage features provided by many vendors, the ability to create frozen images of storage devices has been increasing in importance. A frozen image of a storage device such as a volume or a file system may be defined as a representation or a logical copy of the device at a point in time. Frozen images may be utilized to support a variety of functions where an unchanging, internally consistent set of data may be required, including backups and off-line analysis (e.g., decision support and data mining). Numerous techniques to create frozen images, such as file system cloning, checkpoints, volume mirroring, and software and hardware snapshots, have been developed by different vendors. In enterprises utilizing a heterogeneous collection of operating systems, frozen image creation and access may require coordination of functions across multiple heterogeneous hosts and/or storage servers with varying functional and performance capabilities. As the amount of data managed within an enterprise grows, and as the population of users within the enterprise that may benefit from using frozen images grows, the number of frozen images desired or created using the different techniques available may also grow, potentially leading to a diverse collection of unshared, uncoordinated and possibly duplicated frozen images, some of which may not be easily accessible to the entire set of potential frozen image consumers. A hardware vendor-independent, operating system-independent unifying framework and service to help identify, characterize and manage the lifecycle of existing and potential frozen images may therefore be highly desirable in a distributed storage environment, especially if such a service is capable of operating with a variety of different file systems and volume managers from different software vendors.

SUMMARY OF THE INVENTION

Various embodiments of a system and method for distributed discovery and management of frozen images in a storage environment are disclosed. According to a first embodiment, a system may include a first and a second computer host, a first and a second frozen image agent and a frozen image server. Each of the first and second frozen image agents may be configured to automatically identify one or more storage hierarchies hosted at a respective computer host, and to provide an encoding representing the identified storage hierarchies to the frozen image server. The frozen image server may be configured to aggregate the encodings provided by the frozen image agents into a system-level storage hierarchy catalog. The system-level storage hierarchy catalog and a frozen image operation interface may be provided to a frozen image consumer, allowing the consumer to request a frozen image operation on one or more hierarchies represented within the catalog.

In a second embodiment, a frozen image agent may also be configured to identify applications that may be utilizing the storage hierarchies at a given node, i.e., to associate different applications with the specific storage hierarchies at which their application data may be stored. The frozen image agent may also include an indication of such associations in the encoding provided to the frozen image server, and the frozen image server may incorporate a representation of the associations within the system-level storage hierarchy catalog.

Several other embodiments are also disclosed. According to a third embodiment, a frozen image agent may also be configured to identify a frozen image relationship between a pair of storage devices at a given host; that is, to identify that a first storage device is the source of a frozen image creation operation, and a second storage device is the target of the frozen image creation operation. The frozen image agent may also include a representation of the frozen image relationship between the storage devices in the encoding provided to the frozen image server. The representation of the storage device-level frozen image relationship may include an identification of the specific frozen image creation method used, such as file system cloning, volume mirror break-off, copy-on-write snapshot, hardware snapshot, etc. In addition, the representation may also include other details such as a type of the relationship (e.g., a complete replication or a snapshot), one or more timestamps indicating when the frozen image was created and/or initiated, and a current or active state of the relationship (e.g., synchronizing, synchronized, fractured, replicating, etc.). Based on the information on the frozen image relationship between the storage devices, the frozen image server may include a representation of a frozen image relationship between the parent storage hierarchies of the storage devices (i.e., the storage hierarchies to which the first and second storage devices belong) in the system-level storage hierarchy catalog.

A frozen image consumer may request any of a variety of frozen image operations on the storage hierarchies represented within the system-level storage hierarchy catalog. For example, the consumer may request a listing of existing storage hierarchies, including sources and targets of frozen image operations, or a creation of a frozen image of a storage hierarchy. The requested frozen image may be created at the same host as the corresponding source storage hierarchy, or it may be created or imported at a different host. The frozen image consumer may also schedule a series of periodic frozen image creations for one or more source storage hierarchies. In addition, the consumer may create named groups of storage hierarchies (where each group may include sources and/or targets of frozen image operations), and request operations on the named groups.

In one embodiment, a frozen image server may be configured to partition a frozen image operation requested by a frozen image consumer into two or more sub-tasks, where a first sub-task may be performed on a first storage hierarchy and a second sub-task may be performed on a second storage hierarchy. The frozen image server may send the first sub-task to a first frozen image agent for execution at a first host, and the second sub-task to a second frozen image agent for execution at a second host. The frozen image server may be configured to coordinate the execution of the sub-tasks, and to notify the frozen image consumer that the requested operation is completed after all sub-tasks are completed.

A frozen image agent may include various components in one embodiment, including device and application discovery software, object representation software (e.g., to represent discovered devices, device relationships and applications according to a frozen image object model), sub-task execution software, and agent communication software. In another embodiment, a frozen image server may include object aggregation software (e.g., to create a system-level storage hierarchy catalog using encodings of host-level information provided by frozen image agents), task management software, a frozen image operation interface, and server communication software.

In some embodiments, a decentralized frozen image service may be used, where functions provided by a frozen image agent (such as discovery and sub-task execution) may be partly or fully combined with functionality of a frozen image server (such as aggregation of frozen image information and coordination of multi-host frozen image operations) at one or more hosts 201, e.g., in the form of a decentralized frozen image server at each such host. Each decentralized frozen image server in such an embodiment may be configured to communicate with other decentralized frozen image servers to exchange frozen image information as needed, using any desired communication mechanism such as message-oriented middleware (MOM). In such a decentralized service, information on storage hierarchy frozen image relationships may be automatically distributed or replicated among a set of hosts whose storage devices may be involved in the relationships. Frozen image operations, such as frozen image creations, may be initiated from a decentralized frozen image server any host, and coordinated by the initiating decentralized frozen image server. Queries for frozen image information (e.g., queries to locate source and target storage hierarchies) may be sent to multiple hosts, and responses received (e.g., using the message oriented middleware) from each host. Such a decentralized service may be more tolerant to node failures than one employing a central frozen image server.

Figure 1:
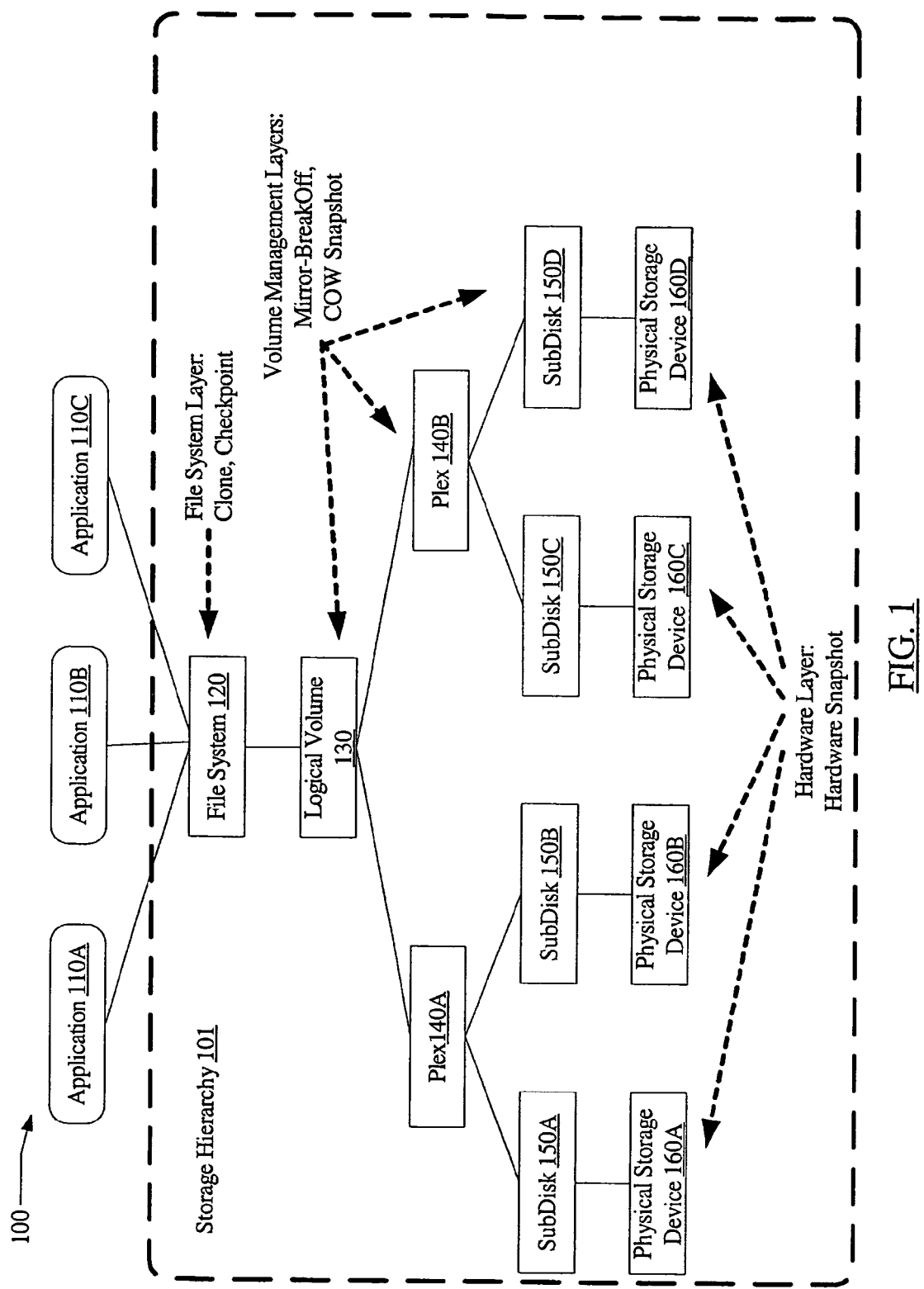
FIG. 1 is a block diagram illustrating a storage hierarchy, associated applications, and examples of frozen image creation operations according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a storage hierarchy 101, associated applications 110A-C, and examples of frozen image creation operations that may be performed at various levels of storage hierarchy 101 according to one embodiment. Applications 110A, 110B and 110C (collectively referred to herein as applications 110) may manipulate data stored within a file system 120 that uses storage within a logical volume 130 (which may also be termed volume 130). Logical volume 130 may be organized as a collection of subordinate virtual storage objects called plexes (140A and 140B, collectively referred to as plexes 140). Each plex 140 in turn may consist of two virtual storage objects called subdisks 150 (e.g., plex 140A may consist of subdisk 150A and 150B, and plex 140B may consist of subdisk 150C and 150D), and each subdisk 150 may utilize storage within a corresponding physical storage device 160 (e.g., subdisk 150A may utilize storage within physical storage device 160A, subdisk 150B may utilize physical storage device 160B, etc.). Layers comprising logical volume 130, plexes 140 and subdisks 150 may collectively be termed volume management layers of the storage hierarchy 101.

For various reasons, it may be desirable to create a copy of the data stored within storage hierarchy 101 by one or more applications 110 as of a point in time. For example, an application 110A may be an online transaction processing (OLTP) application, and it may be desired to perform data mining on the transaction data generated by application 110A. In order to reduce or prevent resource contention (e.g., contention for I/O operations, memory, or processing power) between the data mining operations and the ongoing transaction activity of the OLTP application, a copy of the application data as of a certain time (e.g., end of business on the last day of a fiscal quarter) may be created. The data mining application may then utilize the copied data rather than the version in use by the OLTP application 110A. Such a copy may be termed a frozen image of the data of storage hierarchy 101 (or, more briefly, as a frozen image of storage hierarchy 101), and a method or technique used to create the frozen image may be termed a frozen image method (FIM). Frozen images may also be created for data backup, replication, and to support other functions such as data migration or content distribution.

A variety of alternative frozen image methods may be available at various levels of storage hierarchy 101, as shown in FIG. 1. For example, in some embodiments a file system (or an operating system) may support methods such as file system cloning or file system checkpointing to allow a frozen image of a file system 120 to be created. The cloned file system or the checkpointed file system data may be stored at the same logical volume 130 in some implementations, and at a different logical volume or volumes in other implementations. At the volume management layers, other software techniques such as mirror break-off or copy-on-write (COW) snapshots may be employed to obtain a frozen image. For example, plexes 140 may themselves be mirrored (i.e., plex 140A may contain a copy of the data stored in plex 140B) within volume 130. In one embodiment, a third mirrored plex 140C may be attached to volume 130 and synchronized with existing plexes 140A and 140B. Third mirrored plex 140C may then be broken off or removed from volume 130, forming a frozen image as of the time of mirror break-off. Finally, as indicated in FIG. 1, in some embodiments physical storage devices 160 may also be configurable to create copies or snapshots at the hardware level, e.g., by copying data rapidly from a set of source hardware physical storage devices to a set of compatible target physical storage devices. Hardware snapshot capabilities may be provided by some disk arrays, and also by virtualization appliances. Different physical storage device vendors may provide distinct, mutually incompatible frozen image methods (so that, for example, it may be impossible to create a hardware snapshot of a source storage hierarchy 101 that uses physical storage vendor V1 at a set of physical storage devices from a different vendor V2).

Any available frozen image method described above may be used by a frozen image consumer to create one or more frozen images of the data being used by a given set of applications 110. Prior to the creation of a frozen image using any of the methods, however, certain preparatory steps may have to be taken, as described below in further detail. For example, the specific storage devices (e.g., file systems 120 or volumes 130) being used by the applications 110 may first have to be identified. Once the storage devices of the source storage hierarchy 101 have been identified, other applications that may be using any of the storage devices (and so may be in the process of modifying the data of which a frozen image is desired) may also need to be identified. Transactional applications and operating system services (such as file system caching services) whose data may be part of, or affected by, a frozen image creation may have to be "quiesced", i.e., brought to a state where the data for in-flight transactions may be stored to persistent storage in order to preserve transactional consistency, and where new transactions may be temporarily locked out. In some embodiments, an ongoing hardware or software replication process may have to be quiesced as part of, or before, the frozen image method is implemented. After a frozen image is created, applications and storage services nodes that were earlier quiesced may need to be resumed or "unquiesced". A set of storage hierarchies 101 whose storage devices may be affected by such quiescing and/or unquiescing of applications and services for a given frozen image creation operation may be termed a "storage hierarchy consistency group" in some embodiments. In addition, frozen images may be managed in a manner similar to the way other storage objects such as file systems or volumes are managed, as also described below in greater detail. For example, attributes may be associated with named frozen images, frozen images may be shared among different consumers, metadata about frozen images may be stored in a database, etc.

Figure 2:
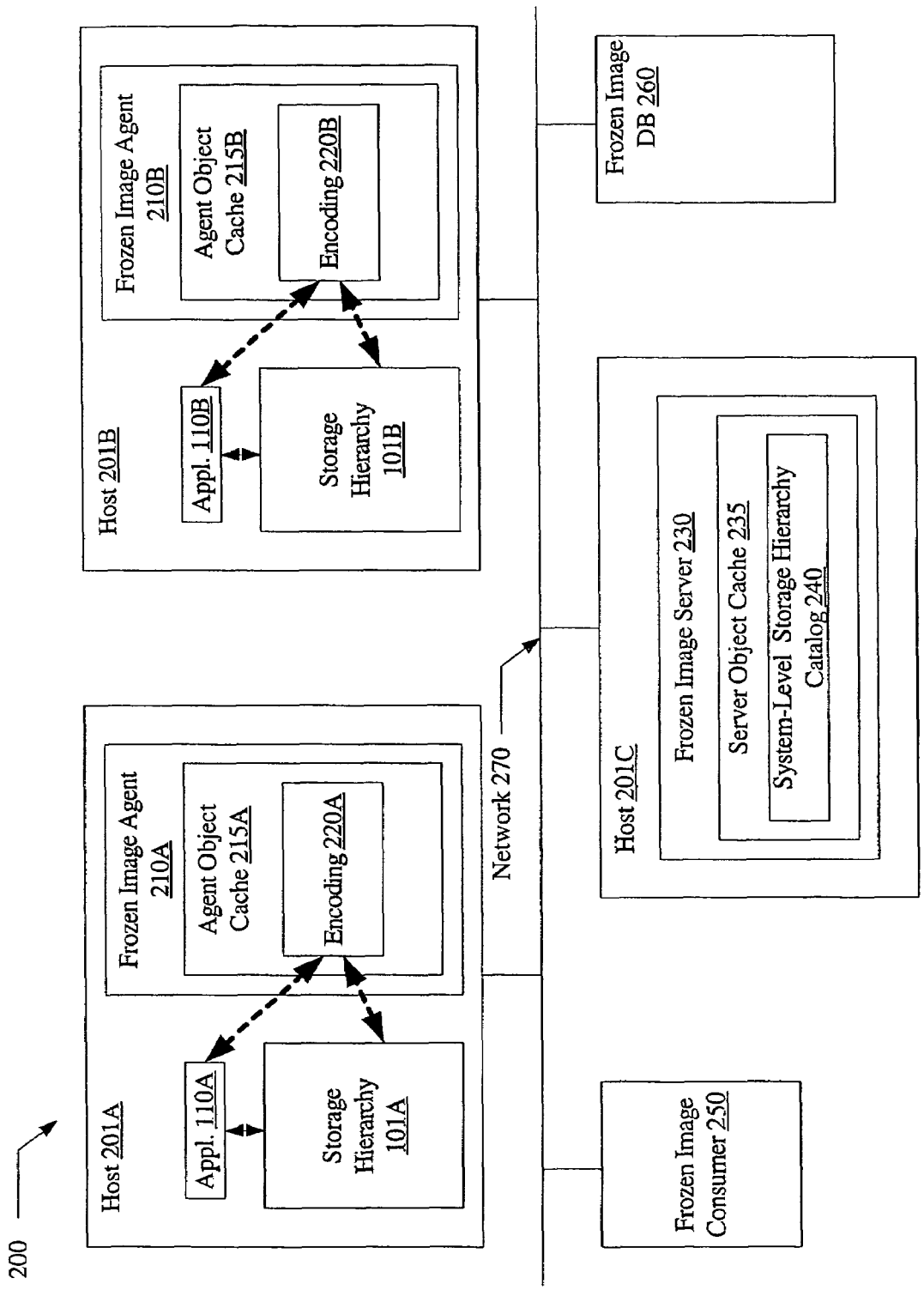
FIG. 2 is a block diagram illustrating one embodiment of a storage system.

FIG. 2 is a block diagram illustrating one embodiment of storage system 200 where a frozen image server 230 and frozen image agents 210A and 210B are configured to collectively provide services to support the creation and management of frozen images by a frozen image consumer 250. The services provided may include performing the preparatory steps noted above (including quiescing), creating one or more frozen images using a suitable frozen image method, resuming quiesced applications and storage services, and managing the lifecycle of frozen images (e.g., modifying attributes of frozen images, renaming or deleting images, etc.). As shown, frozen image agents 210A and 210B may be incorporated within host computers 201A and 201B, respectively, while frozen image server 230 may be incorporated within host computer 201C. Host computers 201A, 201B, and 201C (collectively, hosts 201), frozen image consumer 250, and a frozen image database 260 may all be coupled to a network 270. It is noted that different operating systems may be in use at hosts 201, and operating-system-independent communication protocols may be used for communication between frozen image consumer 250, frozen image server 230 and frozen image agents 210 (i.e., 210A and 210B).

Figure 3:
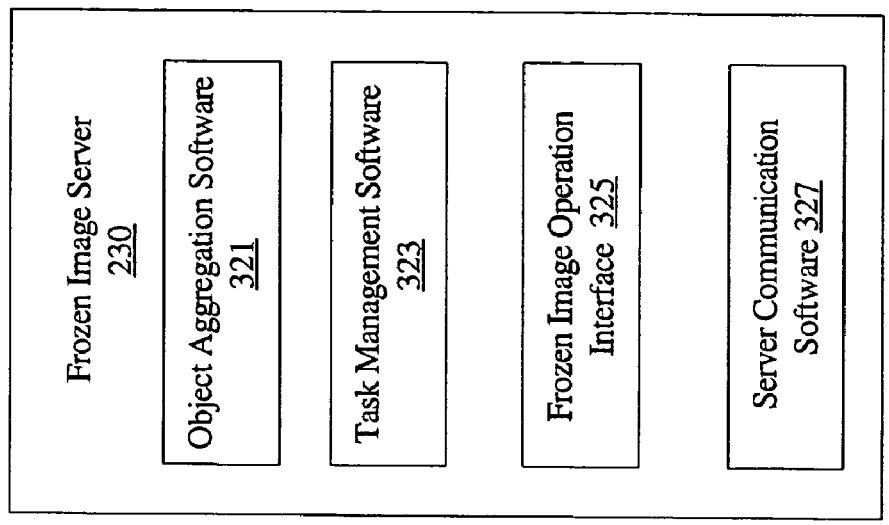
FIG. 3 is a block diagram illustrating subcomponents that may be included within a frozen image agent and a frozen image agent according to one embodiment.
Figure 3:
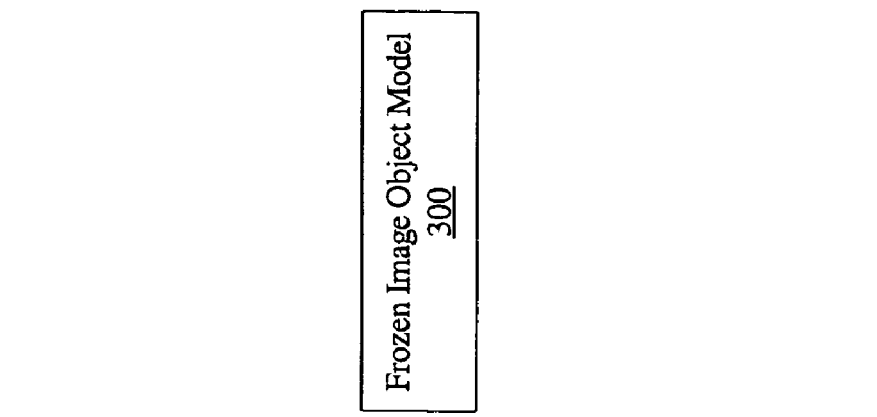
Figure 3:
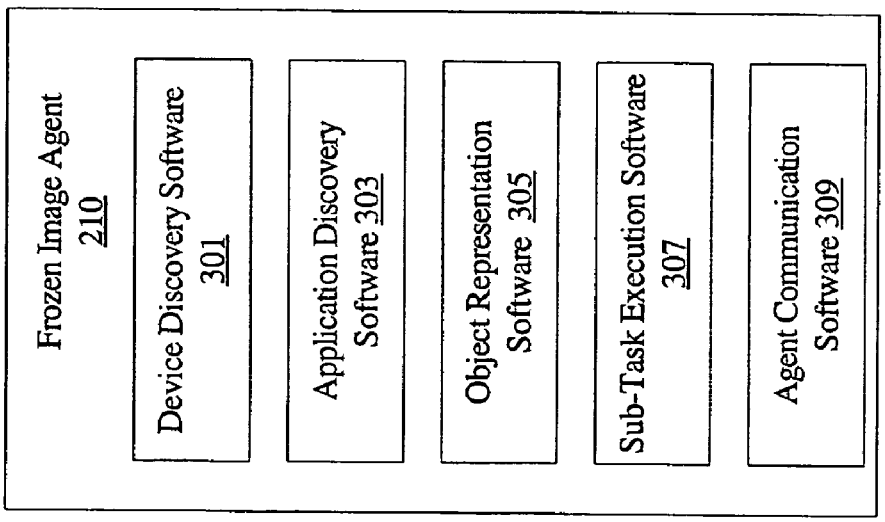

In general, a frozen image agent 210 may be configured to provide two broad types of functions: functions related to the discovery and representation of entities (e.g., storage devices such as file systems 120 and volumes 130 that form part of storage hierarchies 101, and applications 110 using the storage devices) that may participate in or be included in frozen image operations at a given host 201, and functions related to the execution of frozen image sub-tasks at a given host 201 on behalf of frozen image server 230. FIG. 3 is a block diagram illustrating subcomponents that may be included within a frozen image agent 210 and a frozen image server 230 according to one embodiment. As shown, a frozen image agent may include device discovery software 301 and application discovery software 303 to automatically identify the storage devices and storage hierarchies 101 at a given host 201 and the applications 110 associated with or utilizing the storage hierarchies, respectively. Frozen image agent 210 may also be configured to create an encoding 220 (e.g., encoding 220A of FIG. 2) to represent the discovered entities according to a frozen image object model 300 using object representation software 305, and to make the encoding available to frozen image server 230 using agent communication software 309. In addition, sub-task execution software 307 may be employed by frozen image agent 210 to execute frozen image sub-tasks at a given host. Requests for sub-tasks may be received from frozen image server 230 via communication software 309.

In contrast to the host-level functions provided by frozen image agents 210, frozen image server 230 may be configured to provide and coordinate frozen image services at a system-wide level. For example, frozen image server 230 may include object aggregation software 321 configured to create a system-level storage hierarchy catalog 240 using the results of host-level discovery operations performed by frozen image agents 210. Task management software 323 included within frozen image server 230 may be employed to coordinate frozen image operations (such as frozen image creations, imports, exports etc.) that may involve storage devices, storage hierarchies 101 and/or applications 110 at one or more hosts 201. Frozen image server 230 may be configured to provide all or part of system-level storage hierarchy catalog 240, and a frozen image operation interface 325, to a frozen image consumer 250, allowing frozen image consumer 250 to request various types of frozen image operations. In one embodiment, for example, a frozen image consumer 250 may use frozen image operation interface 325 to request that a frozen image of a storage hierarchy 101A (i.e., a storage hierarchy similar to storage hierarchy 101 depicted in FIG. 1) at a first computer host 201A be created using a second hierarchy 101B (i.e., a second storage hierarchy similar to storage hierarchy 101 depicted in FIG. 1) at a second computer host 201B. Frozen image server 230 may respond to such a request by issuing requests for a set of host-level frozen image sub-tasks (e.g., application quiesce tasks, data replication tasks, etc.) to frozen image agents 210 at hosts 201A and 201B, and coordinating the execution of the sub-tasks (e.g., by periodically obtaining sub-task status) until the requested frozen image is successfully created. Server communication software 327 may be utilized by frozen image server 230 to communicate with frozen image agents 210 and frozen image consumers 250. The subcomponents of frozen image server 230 may also utilize frozen image object model 300 used by frozen image agent 210 for internal representations of storage devices, storage hierarchies 101, applications 110, etc. The functionality and services provided by frozen image agents 210 and frozen image server 230 are described in further detail below.

In order to provide the required frozen image services noted above, frozen image agents 210 and frozen image server 230 may need to maintain information about a number of different entities, and on logical relationships between the entities. For example, information may be needed on the attributes of various storage devices, such as file systems 120, volumes 130, plexes 140, and physical storage devices 160, the manner in which they relate to each other to form storage hierarchies 101, and on frozen image relationships between storage devices and between storage hierarchies 101. In addition, information on the relationships between applications 110 and storage hierarchies 101 may also be needed, for example in order to determine the set of applications that may be quiesced prior to a frozen image creation operation. In large distributed storage configurations, information about hundreds or thousands of such entities and relationships may be maintained.

Figure 4:
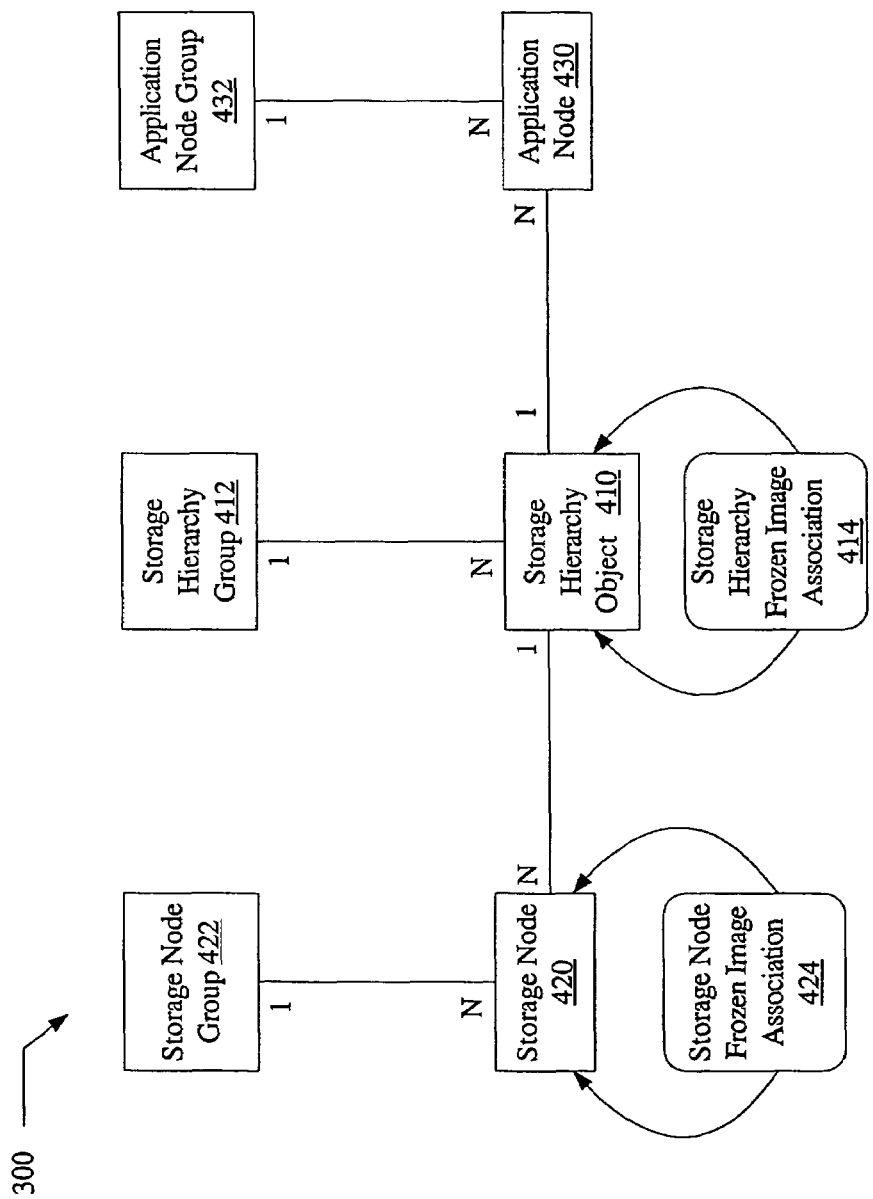
FIG. 4 is a block diagram illustrating objects included in a frozen image object model according to one embodiment.

As noted above, a frozen image object model 300 may be utilized by frozen image agents 210 and frozen image servers 230 to represent these entities. FIG. 4 is a block diagram illustrating objects included in frozen image object model 300 according to one embodiment. Frozen image model 300 may include three broad classes of objects: objects representing core entities of the model (such as storage node objects 420, storage hierarchy objects 410, and application node objects 430 in FIG. 4), objects representing collections of core entities (such as storage node groups 422, storage hierarchy groups 412, and application node groups 432), and objects representing frozen image associations (e.g., storage node frozen image association objects 424 and storage hierarchy frozen image association objects 412).

The core objects of frozen image object model 300 may represent the entities shown in FIG. 1. For example, a storage hierarchy 101 consisting of numerous storage devices such as file system 120 and logical volume 130 may be modeled as a storage hierarchy object 410 with a 1:N relationship with storage node objects 420 (i.e., multiple storage node objects 420 may be related to a single storage hierarchy object 410). Similarly, a storage hierarchy object 410 may have a 1:N relationship with application node objects 430, modeling the relationship between multiple applications 110 and a storage hierarchy 101. In some embodiments, a relationship between storage node objects 420 and application node objects 430 may be included within frozen image object model 300, in addition to, or in place of, the relationship between storage hierarchy objects 420 and application node objects 430.

The collection objects of frozen image object model 300 (storage node groups 422, storage hierarchy groups 412, and application node groups 432) may provide mechanisms to refer to, and perform operations on, named groups of corresponding individual entities. For example, a group of storage hierarchies may be given a name based on the department or business unit utilizing the storage hierarchies (e.g., "Finance", "Engineering", "Sales" etc.), and a frozen image operation may be performed on the named group as a unit (i.e., on each of the hierarchies within the group). Such a named group of storage hierarchies may be represented by a storage hierarchy group object 412. Collection objects may also be used to indicate dependencies between storage hierarchies 101. For example, a source storage hierarchy and a set of related frozen images may be represented by a storage hierarchy group object 412. (In some embodiments, a different object type such as a "storage hierarchy consistency group" object may be used to represent dependent sets of storage hierarchies, for example a set of storage hierarchies whose storage devices need to be quiesced and/or unquiesced together, while storage hierarchy group objects 412 may be used to represent arbitrary collections of storage hierarchies.)

The frozen image association objects may represent frozen image relationships at two levels: between individual storage devices and between storage hierarchies. For example, if the hardware snapshot described earlier is used to create a frozen image of a physical storage device 160A at a second physical storage device 160B, a storage node frozen image association object 424 may be used to model the frozen image relationship between a storage node object representing device 160A and a storage node object representing device 160B. As described below in further detail, frozen image server 230 may be configured to aggregate storage node-level frozen image relationship information gathered from frozen image agents 210 into storage hierarchy-level frozen image relationships. Frozen image server 230 may represent such storage hierarchy-level frozen image relationships using storage hierarchy frozen image association objects 414.

Each object of frozen image object model 300 may have attributes associated with it, as well as pointers to other objects. For example, in one embodiment a storage node object 420 may include a unique identifier attribute "storage_node_ID" and a Boolean attribute "is_root". "Is_root" may be used to indicate whether a particular instance of storage node object 420 represents a root storage device of a storage hierarchy 101. In addition, a storage node object 420 may include a list or array of child node objects (e.g., identifiers of other storage node objects 420), and a pointer to one or more parent storage hierarchy objects 410.

A storage hierarchy object 410 may represent a potential or actual source for a frozen image operation, and/or a potential or actual target of frozen image operations. That is, both a source of a frozen image, and the frozen image itself, may be modeled using storage hierarchy objects 410. In one embodiment, the attributes of storage hierarchy objects 410 may include an identifier (e.g., "hierarchy_ID"), Boolean attributes "is_primary" and "is_secondary" and "is_remote_replica", a status indicator (e.g., "state"), as well as attributes identifying the creator of the storage hierarchy, the current owner of the storage hierarchy, the type of storage hierarchy (based on a defined storage hierarchy taxonomy) etc. The "is_primary" attribute may be used to indicate whether a storage hierarchy is a potential or actual source for a frozen image operation. The "is_secondary" attribute may be used to indicate whether a storage hierarchy is a frozen image, i.e., a target of a frozen image operation. The "is_remote_replica" attribute may be used to indicate that a storage hierarchy is a target of a frozen image operation whose source storage hierarchy is on a different or remote host. It is noted that a storage hierarchy 101 may be both a source and a target of frozen image operations. For example, if a first frozen image of a storage hierarchy 101A is created at a second storage hierarchy 101B, and a second frozen image of storage hierarchy 101B is created at a third storage hierarchy 101C, storage hierarchy 101B may be both a source and a target. Thus, both "is_primary" and "is_secondary" may be set to "true" for a given instance of a storage hierarchy object 410 (and potentially, "is_remote_replica" may also be set to "true" for the same instance).

The association objects representing frozen image relationships may have attributes identifying the source and target storage nodes or hierarchies, as well as attributes identifying and describing properties of the frozen image methods used. For example, in one embodiment, a storage node frozen image association object 424 may include attributes "source_storage_node" and "target_storage_node" (identifying source and target storage node objects respectively), "frozen_image_method" (indicating the specific frozen image method used to create the frozen image), and "synchronization mode" (indicating whether a synchronous or asynchronous method of replication is used for the frozen image). For example, the frozen image method may be file system cloning, a hardware array snapshot, a virtualization appliance snapshot, a copy-on-write snapshot, a volume snapshot, other software or hardware replication mechanisms, etc. Attributes of a storage node frozen image association object may also be used to specify, for example, one or more timestamps at which the corresponding frozen image method was invoked or initiated, and a classification or type of the frozen image method (e.g., full replication vs. snapshot). Additional attributes may specify status information, which may vary based on the type of frozen image operation (e.g., whether the state of the frozen image is "synchronizing", "synchronized", "replicating", "fractured", etc.) Similarly, a storage hierarchy frozen image association object 414 may include a "source_storage_hierarchy" attribute and a "target_storage_hierarchy" attribute, in addition to various attributes similar to those described above for storage node frozen image association objects. By including information about the frozen image method in this manner, storage node frozen image association objects 424 allow information about diverse software and hardware frozen image methods (e.g., file system cloning, volume mirroring, software and hardware snapshots, etc.) to be represented using a single object type, thus helping to simplify frozen image management in a heterogeneous storage environment.

It is noted that in some embodiments, frozen image object model 300 may also include objects representing other entities not depicted in FIG. 4, such as objects representing frozen image sub-tasks and management policies such as frozen image creation scheduling policies, quota policies (e.g., policies limiting the number of frozen images and/or the amount of physical storage used for frozen images by a frozen image consumer 250), etc. Frozen image sub-tasks and management policies are described in further detail below. In one embodiment, frozen image object model 300, and encodings 220 made using frozen image object model 300, may be implemented using an operating-system-independent object modeling infrastructure.

It is noted that frozen images or secondary storage hierarchies 101 may not always be "read-only" entities. Depending on the specific frozen image method used to create a frozen image, for example, the frozen image may be periodically "refreshed", i.e., updates made at the source storage hierarchy since the initial creation of the frozen image may be replicated at the frozen image. In some embodiments, a frozen image or secondary storage hierarchy 101 may itself be made directly writable—that is, after the frozen image has been created, frozen image consumers 250 and/or other storage consumers may be permitted to modify data stored at the secondary storage hierarchy 101. Frozen images that may be modified may be termed "active" images, to distinguish them from read-only or "passive" images.

As described above, the discovery or identification of storage devices, storage hierarchies 101 and associated applications 110 at a given computer host 201 that may be affected by, or participate in, a frozen image operation may be one of the primary responsibilities of a frozen image agent 210. Discovery may be performed in a top-down manner in some embodiments, that is, frozen image agent 210 may be configured to start with an application (e.g., a relational database system) 110 and identify the specific storage devices (e.g., file systems 120, volumes 130, plexes 140 and physical storage devices 160) of storage hierarchies 101 that store the data manipulated by the application. In other embodiments, frozen image agent 210 may be configured to perform discovery in a bottom-up manner, e.g., to start with a storage device such as a file system 120 or a volume 130, and identify the set of applications that may be using the storage device, and various application interfaces that may be used to quiesce and/or resume the identified applications. In one embodiment, both top-down and bottom-up discovery may be performed: for example, a frozen image agent 210 may start with a given application 110, discover the storage devices used by the application using device discovery software 301, and then use application discovery software 303 to identify other applications 110 that may also be using the storage devices. Various techniques may be used to enable frozen image agents 210 to perform discovery operations in different embodiments. In one embodiment, storage management software such as VERITAS Volume Manager™ and associated products may provide plug-ins that allow frozen image agents 210 to automatically discover when a new storage device is configured at a given node, when a particular application is configured to use a new storage device, etc. In another embodiment, frozen image agents 210 may be configured to query applications 110 that may provide mappings to the specific storage devices where the application data may be stored, to utilize operating system tools or third-party tools that identify associations between applications and files or volumes, etc. As part of its discovery functionality, frozen image agent 210 may also identify frozen image relationships between storage devices at a given host, for example if two file systems 120 are clones of each other.

Figure 5:
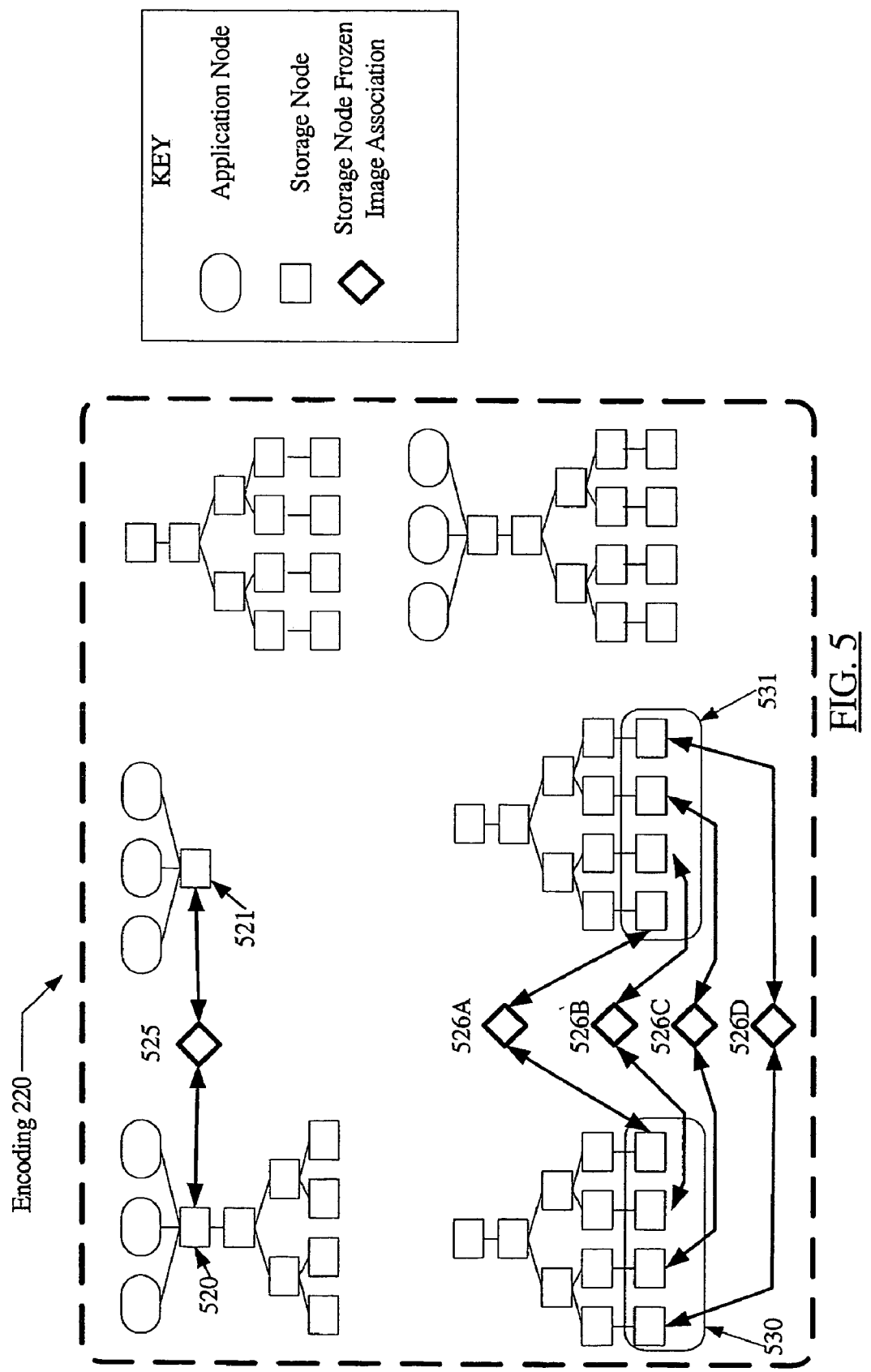
FIG. 5 is a block diagram illustrating an exemplary encoding created by a frozen image agent according to one embodiment.

In addition to performing discovery operations as described above, a frozen image agent 210 may also include object representation software 305 that may be configured to create an encoding 220 of the discovered storage devices, storage hierarchies 101 and related applications 110 using frozen image object model 300. FIG. 5 is a block diagram illustrating an exemplary encoding 220 that may be created by a frozen image agent 210 using object representation software 305 according to one embodiment. As shown, an encoding 220 may include storage node objects logically linked by parent-child relationships, application node objects and storage node frozen image association objects. In the depicted encoding, frozen image agent 220 may have identified two storage device frozen image relationships, and encoded them using storage node frozen image association objects 525 and 526A-526D. Storage node frozen image association object 525 may represent a cloning of a first file system 120 modeled as storage node 520, whose clone may be modeled as storage node 521. (The cloned file system may utilize the same underlying volume as the first or source file system, so storage node 521 may be modeled without its own set of subordinate storage nodes.) Storage node frozen image association objects 526A-526D may represent hardware snapshots of four source physical storage devices 160 (modeled as storage nodes 530) at four corresponding target physical storage devices 160 (modeled as storage nodes 531). In some embodiments, frozen image agent 210 may also include other types of objects within an encoding 220, such as storage node group objects.

As shown in FIG. 2, an encoding 220 of the storage devices and applications discovered at a host 201 by a frozen image agent 210 may be maintained within an in-memory agent object cache 215 in some embodiments. The agent object cache may be backed by a local agent object store, for example within a physical storage device such as a disk accessible from host 201A in one implementation. As noted earlier, a frozen image agent 210 may include agent communication software 309 that may transmit encoding 220 from frozen image agent 210 to frozen image server 230, e.g., over network 270. In some embodiments, agent communication software 309 may be configured to transmit encoding 220 whenever the encoding changes (e.g., when a new storage device is configured at a host 201 and discovered and modeled by frozen image agent 210), while in other embodiments agent communication software 309 may be configured to periodically transmit a current version of encoding 220 (e.g., once every ten minutes) to frozen image server 230.

Figure 6:
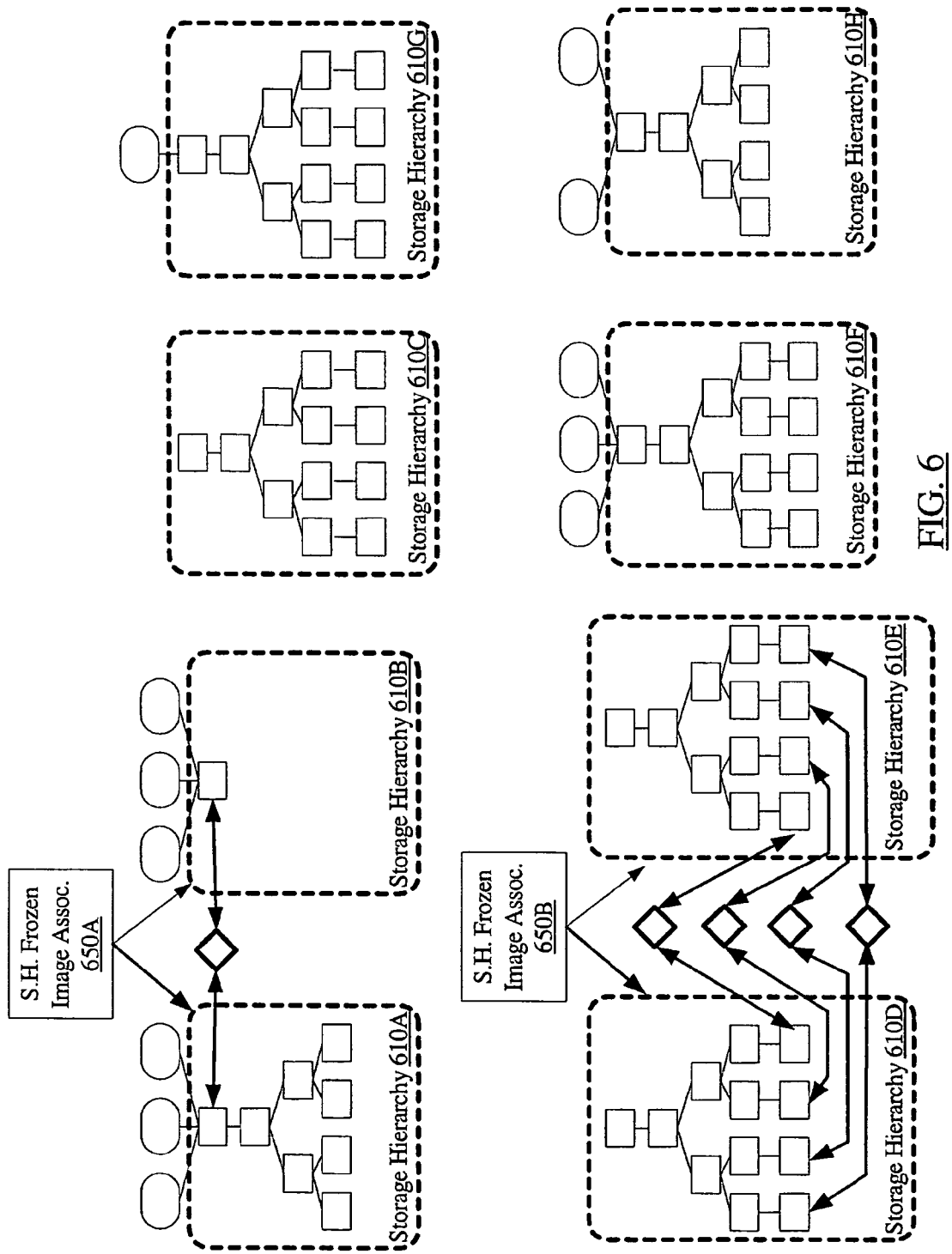
FIG. 6 is a block diagram illustrating an exemplary system-level storage hierarchy catalog according to one embodiment.

Frozen image server 230 may include server communication software 327 to collect the encodings 220 provided by the different frozen image agents 210, and object aggregation software 321 to compile the encoded information about storage devices, storage hierarchies 101 and applications 110 into a system-level storage hierarchy catalog 240. FIG. 6 is a block diagram illustrating an exemplary system-level storage hierarchy catalog 240 according to one embodiment. In the depicted catalog, frozen image server 230 may have created storage hierarchy objects 610A-610H representing eight storage hierarchies, using encodings 220 provided by frozen image agents 210A and 210B. For example, six storage hierarchy objects 610A-610F may have been created using an encoding 220A provided by frozen image agent 210A about entities at host 201A (similar to the encoding 220 depicted in FIG. 5), while the remaining two storage hierarchy objects 610G-610H may have been created using an encoding 220B provided by frozen image agent 210B at host 201B. Object aggregation software 321 may also be configurable to deduce storage hierarchy-level frozen image relationships using the storage node frozen image association objects (such as 525 and 526A-D) included within encodings 220. E.g., the aggregation software may be configured to create storage hierarchy frozen image association objects 650A and 650B corresponding to storage node frozen image association objects 525 and 526A-D. Among the storage hierarchy objects depicted in FIG. 6, storage hierarchy objects 610A and 610D may represent source storage hierarchies of frozen image operations, storage hierarchy objects 610B and 610E may represent targets of frozen image operations, and the remaining storage hierarchy objects 610C, 610F-610H may represent potential source (or target) storage hierarchies. In addition to the objects depicted in FIG. 6, system-level storage hierarchy catalog 240 may also include other objects of frozen image model 300, such as storage hierarchy groups 412, application node groups 432 and storage node groups 422. In some embodiments, encodings 220 created by frozen image agents may include storage hierarchy objects 410, while in others, it may be the responsibility of frozen image agents 230 to create storage hierarchy objects 410 using storage node relationship information included within encodings 220.

As illustrated in FIG. 2, in some embodiments, frozen image server 230 may create system-level storage hierarchy catalog 240 within an in-memory server object cache 235. A persistent version of system-level storage hierarchy catalog 240 may be stored within a frozen image database 260 in such embodiments. In one embodiment, frozen image database 260 may be populated with a new entry (e.g., a new storage hierarchy object 410) whenever a new instance of an object of frozen image object model 300 is created by frozen image server 230. By storing the objects of system-level storage hierarchy catalog 240 within frozen image database 260 in this manner, frozen image server 230 may allow information about frozen images to remain available across system reboots, cluster failovers, etc. As the number of objects within system-level storage hierarchy catalog 240 increases, not all the objects may be maintainable efficiently within server object cache 235 in some embodiments. Frozen image server 230 may be configured to retrieve desired objects from frozen image database 260 into server object cache 235 as needed. A variety of server object cache management policies, including object replacement policies, may be employed in different embodiments. For example, in one embodiment, frozen image server 230 may be configured to track the amount of frozen image activity (e.g., frozen image creations, exports, imports etc.) at each storage hierarchy 101 represented within system-level storage hierarchy catalog 240, and to replace the least active storage hierarchy objects when a new object hierarchy may be retrieved from frozen image database 260.

Figure 7:
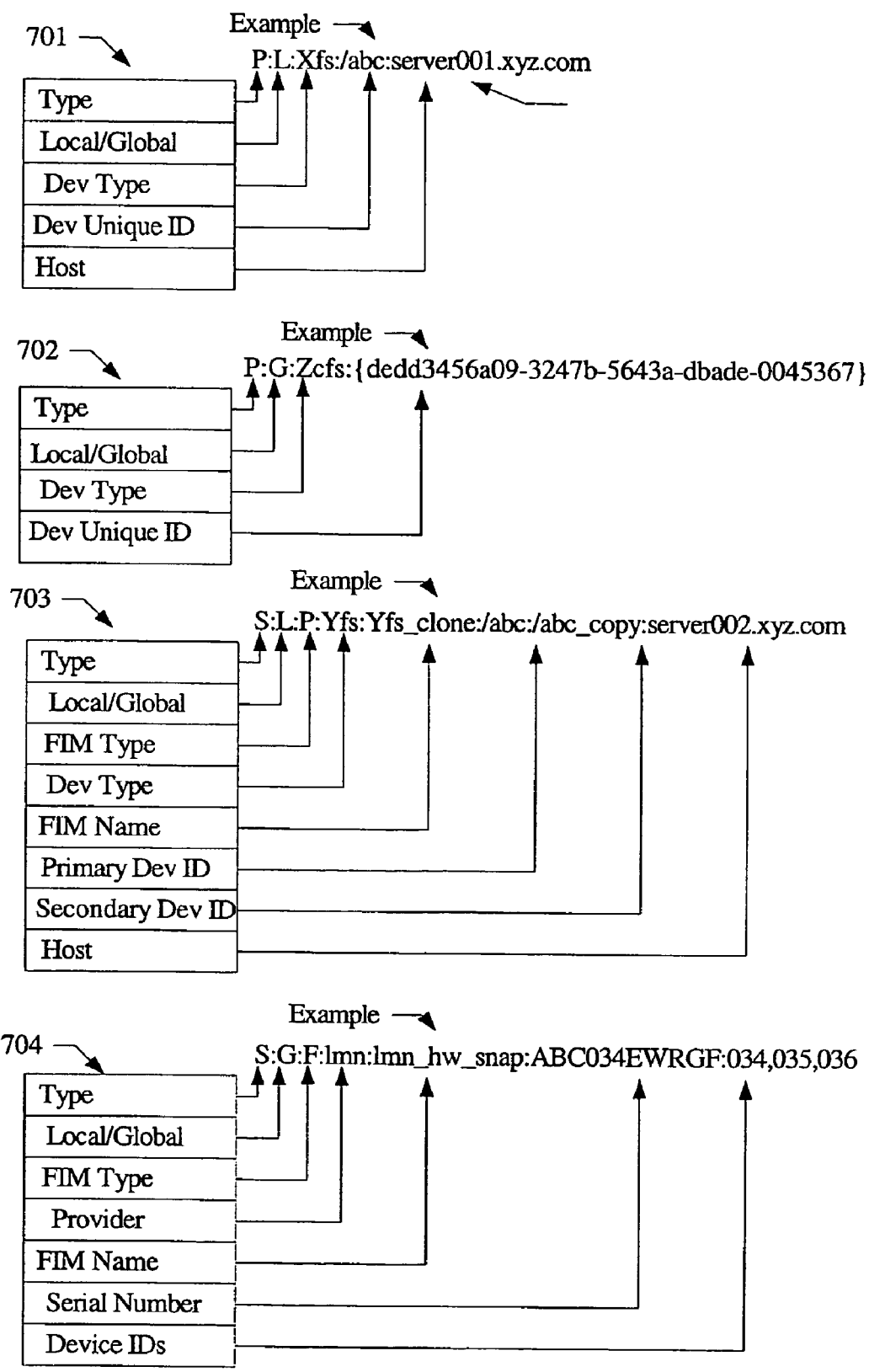
FIG. 7 is a block diagram illustrating a set storage hierarchy identifier formats according to one embodiment.

The attributes of a storage hierarchy object 410 within system-level storage catalog 240 may include an identifier (e.g., "hierarchy_ID"), as noted above. In some embodiments, the identifier may include encoded information about the modeled storage hierarchy 101, such as the type of file system 120 or volume 130 that may form the highest level of the hierarchy. The format of a storage hierarchy identifier, and the information encoded within, may differ for different kinds of storage hierarchies. FIG. 7 is a block diagram illustrating a set of four possible storage hierarchy identifier formats, 701-704, according to one embodiment.

Format 701 may be used to represent a primary storage hierarchy (i.e., one that may serve as a source for a frozen image operation) including a locally-mounted file system (i.e., a file system that is directly accessible only from a given host 201). For example, as shown in FIG. 7, "P:L: Xfs:/abc:server001.xyz.com" may be an identifier structured according to format 701. The component elements of an identifier structured according to format 701 may include an indicator of the storage hierarchy type (e.g., "P" for primary, or "S" for secondary), an indicator of whether the name of the file system or volume at the head of the storage hierarchy is unique globally or only unique locally within the host (e.g., "G" for global, "L" for local), and the type of the device at the head of the storage hierarchy (e.g., a file system type such as "Xfs"). In addition, for primary and local storage hierarchies, the identifier may include the device identifier for the specific device at the head of the storage hierarchy (e.g., a file system name such as "/abc") and the name of the host (e.g., "server001.xyz.com") at which the device is located.

Format 702 may be used to represent a primary storage hierarchy including a globally accessible file system (i.e., a file system that may be directly accessible from any host 201 within system 200). An identifier structured according to format 702 may differ from one structured according to format 701 in that a host name may not be included in the former (as the file system at the head of the hierarchy may be globally accessible, there may be no need to specify a host name). The inclusion of a globally unique device identifier (such as "{dedd3456a09-3247b-5643a-dbade-0045367}" in the depicted example) within the storage hierarchy identifier may help to ensure that a discovery of the same storage hierarchy by two different frozen image agents 210 does not result in duplicate entries within system-level storage hierarchy catalog 240.

Formats 703 and 704 may be used to represent secondary storage hierarchies (i.e., storage hierarchies that are targets of frozen image creation operations), and may include encodings of information related to the frozen image method (FIM) used in creating the corresponding frozen images. FIM attributes encoded within such formats may include an FIM Type (e.g., "F" for a full frozen image such as a mirror break-off, or "P" for a partial frozen image such as a copy-on-write snapshot), the type of storage device (such as a file system type "Yfs") on which the FIM was performed, and the name of the FIM (e.g., "Yfs_clone" or "lmn_hw_snap"). Primary and secondary device identifiers (e.g., the source and target file systems of a file system clone operation) and a host name may be included for local secondary storage hierarchy formats such as format 703. Format 704 may be used for hardware frozen image methods, where the target storage devices 160 may be identified using globally unique serial numbers (e.g., "ABC034EWRGF") and device identifiers (e.g., "034, 035, 036"). Formats for storage hierarchies created by hardware FIMs may also include a hardware vendor or provider name (e.g., "lmn").

The inclusion of encodings of attributes of storage hierarchies 101 within storage hierarchy object identifiers in the manner described above may help to support services such as lookups for specific types of storage hierarchies, or lookups for storage hierarchies from a specified set of hosts, that may be requested by a frozen image consumer 250. It is noted that the formats used to structure storage image identifiers may differ in different embodiments, for example in the nature of the information encoded, in the sequencing of fields, the field separators used, etc. In some embodiments, additional fields (such as a field representing a creation date or time) beyond those described above may be included within storage hierarchy identifiers, while in other embodiments, some of the information described above may not be encoded within storage hierarchy identifiers. In some embodiments, frozen image server model 300 may support the use of alternate (e.g., more user-friendly) names for storage hierarchy objects (such as "Finance_1"), in addition to the encoded identifiers described above.

Frozen image server 230 may present a frozen image operation interface 325 to allow frozen image consumers 250 to query and request operations on the objects of system-level storage hierarchy catalog 240. In one embodiment, for example, a graphical user interface (GUI) may be provided, allowing frozen image consumers 250 to browse system-level storage hierarchy catalog 240 at various levels of detail, e.g., by zooming in on a set of storage hierarchy objects of interest. In other embodiments, application programming interfaces (APIs) and/or command-line tools may be provided to allow frozen image consumers 250 to request frozen image operations, and to allow system administrators to perform frozen image-related configuration operations. In some embodiments, graphical user interfaces and command-line tools may both be provided, and both may utilize a shared set of underlying APIs. For example, in one embodiment the following APIs may be included among the interfaces supported by frozen image server 230. Further details on the listed APIs, including input parameters for some APIs, are provided below.

ListStorageHierarchies( )
ListStorageHierarchyGroups( )
ListApplicationNodes( )
ListApplicationNodeGroups( )
ListStorageNodes( )
ListStorageNodeGroups( )
QueryStorageHierarchies( )
QueryStorageHierarchyGroups( )
QueryApplicationNodes( )
QueryApplicationNodeGroups( )
QueryStorageNodes( )
QueryStorageNodeGroups( )
QueryStorageNodeAssociations( )
QueryStorageHierarchyAssociations( )
CreateFrozenImage( )
DeleteFrozenImage( )
ScheduleFrozenImages( )
RenameStorageHierarchy( )
RestoreStorageHierarchy( )
ResyncStorageHierarchy( )
AssociateStorageHierarchy( )
DisassociateStorageHierarchy( )
CreateStorageHierarchyGroup( )
DeleteStorageHierarchyGroup( )
RenameStorageHierarchyGroup( )
CreateStorageNodeGroup( )
DeleteStorageNodeGroup( )
RenameStorageNodeGroup( )
CreateApplicationNodeGroup( )
DeleteApplicationNodeGroup( )
RenameApplicationNodeGroup( )
ListSupportedFIMs( )
GetStorageHierarchyConfig( )
SetStorageHierarchyConfig( )
SetCustomAttributes( )
GetCustomAttributes( )
OpenSession( )
CloseSession( )
CreateDomain( )
DeleteDomain( )
RenameDomain( )
AddHostToDomain( )
QueryDomains( )

AddAgent( )

RemoveAgent( )

The ListStorageHierarchies( ) interface may be used to obtain a listing of the storage hierarchies represented in a system-level storage hierarchy catalog 240. Similarly, ListStorageHierarchyGroups( ), ListApplicatioNodes( ), ListApplicationNodeGroups( ), ListStorageNodes( ), and ListStorageNodeGroups( ) APIs may be used to obtain a listing of objects of the corresponding object types within the catalog. In some embodiments, ListStorageNodes( ) may also be used to obtain the list of the constituent storage nodes of a given storage hierarchy or set of storage hierarchies, which may be identified by the caller using an input parameter such as "parentHierarchy" or "parentHierarchyList".

APIs whose names begin with the prefix "Query" may be used to restrict searches on catalogued objects based on various criteria, which criteria may be specified as parameters to the APIs. For example, the QueryStorageHierarchies( ) interface may support a "constraintList" parameter, and a caller may be able to obtain a list of secondary storage hierarchies using a constraint such as "is_secondary=true". Similarly, APIs QueryStorageHierarchyGroups( ), QueryApplicationNodes( ), QueryApplicationNodeGroups( ), QueryStorageNodes( ), QueryStorageNodeGroups( ), QueryStorageHierarchyAssociations( ), and QueryStorageNodeAssociations( ) may each support input parameters that may be used to restrict searches for the corresponding object types based on one or more search criteria.

In addition to the APIs used for listing and querying objects, a set of APIs to perform frozen image operations on storage hierarchies may also be provided by frozen image server 230. For example, CreateFrozenImage( ) may be used to create a frozen image of a specified source storage hierarchy using a specified frozen image method, and DeleteFrozenImage( ) may be used to remove a catalogued frozen image (e.g., a secondary storage hierarchy) from system-level storage hierarchy catalog 240. In some embodiments, DeleteFrozenImage( ) may support optional parameters to specify specific actions that may be performed on the deleted storage hierarchy: for example, a deleted secondary storage hierarchy may be marked as "invalid", or the physical storage devices of the hierarchy may be made available for use within some other hierarchy, etc. ScheduleFrozenImages( ) may be used to schedule a series of frozen image operations, as described below in further detail. RenameStorageHierarchy( ) may be used to change the encoded identifier or the alternate name of a specified storage hierarchy.

RestoreStorageHierarchy( ) may be used to restore the data of a primary storage hierarchy by copying data from a previously created secondary storage hierarchy. ResyncStorageHierarchy( ) may be used to refresh the contents of a secondary storage hierarchy by including updates made at the corresponding primary storage hierarchy since the time that the secondary was created. AssociateStorageHierarchy( ) and DisassociateStorageHierarchy( ) may be used to create and delete a storage frozen image association object linking two storage hierarchies, respectively.

Various interfaces to create, delete, or rename objects representing groups of entities may also be supported by frozen image server 230. For example, CreateStorageHierarchyGroup( ), DeleteStorageHierarchyGroup( ), and RenameStorageHierarchyGroup( ) may be used to create, delete and rename storage hierarchy group objects, respectively, and analogous APIs may be used for storage node groups and application node groups.

A ListSupportedFIMs( ) API may be used to obtain a list of frozen image methods that may be used to create a frozen image of a specified storage hierarchy. For example, if a particular storage hierarchy 101N supports file system cloning and volume mirror break-off, but does not support hardware snapshots, an execution of ListSupportedFIMs( ) (specifying storage hierarchy 101N via an input parameter) may result in the caller being provided a listing of the two supported frozen image methods. In some cases, before one of the FIMs supported at a specific storage hierarchy is triggered, additional configuration information may have to be specified for the source storage hierarchy using the SetStorageHierarchyConfig( ) API. For example, if a frozen image is to be created or imported at a host 201 other than the source storage hierarchy host, the name of the host at which the frozen image is to be created or imported may be specified using the SetStorageHierarchyConfig( ) API. Once a list of supported FIMs is obtained and the required additional configuration information, if any, is specified for a given storage hierarchy, frozen image consumer 250 may select one of the supported FIMs and create one or more frozen images, e.g., using a CreateFrozenImage( ) API. Current configuration information for a given storage hierarchy (that may have been specified earlier using SetStorageHierarchyConfig( )) may be obtained using a GetStorageHierarchyConfig( ) API.

User-defined attributes may be specified (e.g., using strings to represent attribute names and associated attribute values) for any of the objects represented within system-level storage hierarchy catalog 240 using a SetCustomAttributes( ) API. Attributes already set for a given object may be retrieved using a GetCustomAttributes( ) API.

Certain frozen image operations, such as frozen image creations or deletions, may require a concurrency control mechanism to be used, for example to resolve potential race conditions, to avoid deadlocks, or to prevent data corruption that may otherwise result from simultaneous updates of a storage device. A mechanism termed a frozen image session (which may also be referred to more simply as a session) may be used to provide the needed concurrency control. Session management APIs such as OpenSession( ) (to start a session) and CloseSession( ) (to end a session) may also be provided by frozen image server 230 to frozen image consumers 250. Resources such as storage devices and/or storage hierarchies may be locked (e.g., by a frozen image server 230 obtaining an exclusive lock) for the duration of a session in some embodiments, and may be released at the end of a session. (Each session may be assigned a session identifier in one embodiment, which may also be used within logging messages generated by frozen image agents 210 and frozen image servers 230 as they perform the frozen image operations requested within the session, allowing for easy association of logging messages with corresponding frozen image operations.)

In some embodiments, multiple frozen image servers 230 may be supported. For example, in one embodiment, the set of hosts 201 may be divided (e.g., for administrative reasons) into named groups called frozen image service domains, and each domain may have its own frozen image server 230 and its own set of frozen image agents 210 (e.g., one frozen image agent 210 may be at each host 201). In other embodiments, a given frozen image server 230 may also support multiple frozen image service domains, or may allow new domains to be created for use by other frozen image servers 230. APIs to support the management of frozen image service domains and frozen image agents 210 may also be provided by frozen image servers 230. CreateDomain( ) may be used to create a new domain comprising a set of hosts 201, DeleteDomain( ) may be used to delete an existing domain. RenameDomain( ) may be used to change the name of a domain, while AddHostToDomain( ) may be used to add a specified host to an existing domain. AddAgent( ) and RemoveAgent( ) may be used to add and remove a frozen image agent 210 at a specified host, respectively.

It is noted that the set of interfaces listed above may be extended and modified in various ways in different embodiments to provide the desired functionality. For example, in one embodiment, additional APIs may be provided beyond those listed above, such as a RefreshCatalog( ) API that allows a system administrator or a frozen image consumer 250 to request a frozen image server 230 to obtain updated encodings 220 from frozen image service agents 210 and regenerate system-level storage hierarchy catalog 240. Functionality similar to that provided by the APIs described above may be provided by using a different set of APIs in another embodiment, for example using a different convention for specifying interfaces and parameters.

The creation of a frozen image, for example in response to a call to a CreateFrozenImage( ) API, may require a sequence of lower-level operations to be completed, some of which may have to be performed at different hosts 201. Before a frozen image of a storage hierarchy 101 at a host 201A is created, applications 110 that use storage hierarchy 101 may need to be quiesced as noted earlier, so that the application data that may be replicated as part of the frozen image is in a transactionally consistent state. In addition, data cached in memory by operating systems components at host 201A, such as file system caches, may also have to be flushed to physical storage devices 160 before a consistent frozen image may be created. After applications and operating system components have been quiesced and/or flushed, the selected frozen image method, such as a mirror break-off or a file system cloning operation, may be executed. When the frozen image method completes execution, the applications 110 that were earlier quiesced may be resumed. In some cases (e.g., when the frozen image method includes the creation of a hardware snapshot), a secondary storage hierarchy created during the frozen image method execution may be imported at another host 201B.

Figure 8:
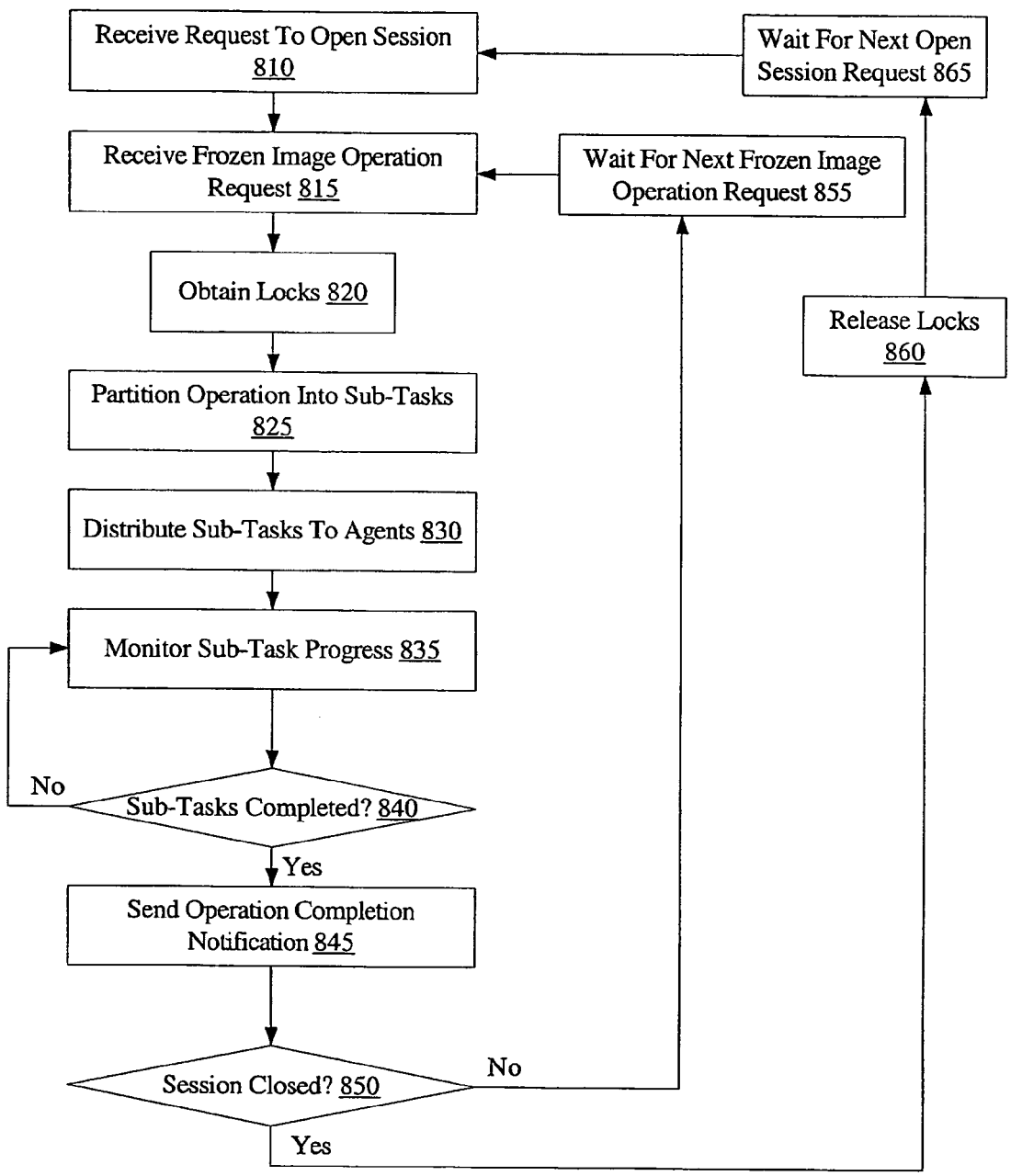
FIG. 8 is a flow diagram illustrating aspects of the operation of one embodiment of a frozen image server.
Figure 9:
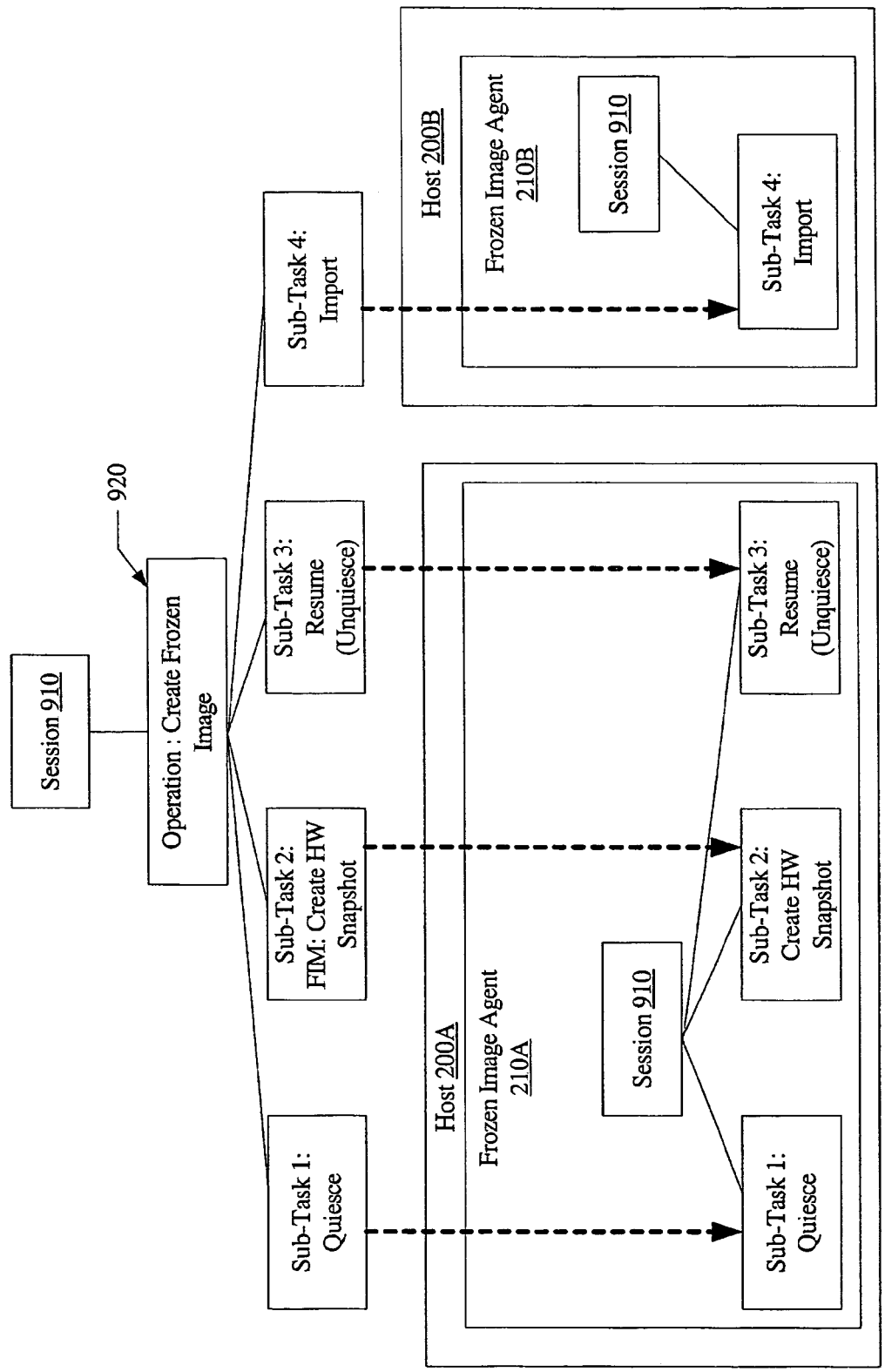
FIG. 9 is a block diagram illustrating an exemplary partitioning of a frozen image creation operation into sub-tasks according to another embodiment

Frozen image server 230 may be configured to respond to a request for a frozen image operation, such as a frozen image creation, by partitioning the work required for the operation into a sequence of sub-tasks, such that each sub-task may be executed at a single frozen image agent 210. FIG. 8 is a flow diagram illustrating aspects of the operation of one embodiment of a frozen image server 230 in response to a request for a frozen image operation, and FIG. 9 is a block diagram illustrating an exemplary partitioning of a frozen image creation operation by a frozen image server 230 into four sub-tasks according to another embodiment.

As noted earlier, a concurrency control mechanism known as a session may be used to control access to storage hierarchies 101 in some embodiments. That is, certain kinds of frozen image operations such as frozen image creates and deletes may be performed within the context of a session, and access to resources such as storage devices that may be modified during the frozen image operations may be restricted for the duration of the session. As depicted in FIG. 8, frozen image server 230 may receive a request to open a session (block 810) before a request to perform a frozen image operation is received (block 815) from a frozen image consumer 250. One or more locks may then be obtained by frozen image server 230 (block 820) to control access (e.g., from other sessions) to storage devices and storage hierarchies 101 that may be affected by the requested operation. A variety of techniques may be used to implement locking for frozen image operations in different embodiments. For example, in one embodiment, exclusive locks may be obtained on objects (such as storage hierarchy objects 410) represented within frozen image database 260 by frozen image server 230. In another embodiment, both exclusive and shared locks may be used, and a distributed, token-based locking scheme may be used instead of a centralized locking scheme managed at frozen image database 260.

Task management software 323 within frozen image server 230 may partition the requested operation into one or more sub-tasks (block 825), such that a given sub-task may be executed by sub-task execution software 307 at a single frozen image agent 210, and distribute the sub-tasks to the appropriate frozen image agents (block 830). For example, as shown in FIG. 9, an operation to create a frozen image 920 as part of a session 910 may be partitioned into four sub-tasks: sub-task 1 to quiesce applications and/or operating systems components, sub-task 2 to create a hardware snapshot (i.e., to execute a desired frozen image method), sub-task 3 to resume or unquiesce applications and/or operating systems components, and sub-task 4 to import the snapshot. Sub-tasks 1-3 may be distributed to frozen image agent 210A at host 201A, and sub-task 4 may be distributed to frozen image agent 210B at host 201B. Not all sub-tasks may be distributed at the same time in some embodiments; for example, if a first sub-task must be completed before a second sub-task can begin at the same host 201, frozen image server 230 may not distribute the second sub-task until it receives a notification from a frozen image agent 210 that the first sub-task has completed. In some embodiments and for some frozen image operations, certain sub-tasks may be executable in parallel at a given host, in which case frozen image server 230 may distribute such tasks concurrently.

It is noted that for some kinds of distributed or clustered applications and services, such as a distributed or clustered file system or clustered volume manager, the application or service may only require quiescence from an agent at a single host 201, rather than from all agents which may be operating at hosts 201 where the distributed application is active. Frozen image server 230 and frozen image agents 210 may be configured to ensure that quiescence is not requested or performed at multiple hosts in such environments.

Agent communication software 309 included within frozen image agents 210 may be configured to receive sub-task requests sent by frozen image server 230. Frozen image server 230 may be configured to monitor the progress or status of the distributed sub-tasks (block 835) as they are executed by sub-task execution software at frozen image agents 210. In some embodiments, during the execution of the sub-tasks for the frozen image operation, the state of sub-tasks and/or the frozen image operation may be transactionally updated within frozen image database 260 by frozen image server 230. In the event that a participant such as a frozen image agent 210 or frozen image server 230 crashes or otherwise becomes inoperable, the state of the frozen image operation may be recovered from frozen image database 260 in such embodiments. The monitoring of sub-tasks may be accomplished using a variety of techniques in different embodiments. For example, in one embodiment, frozen image agents 210 may be configured to periodically send sub-task status to frozen image server 230 (e.g., once every 15 seconds), or to send sub-task status whenever a sub-task transitions from one state to another (e.g., from among a set of previously specified sub-task states). In another embodiment, frozen image server 230 may be configured to poll frozen image agents periodically for sub-task status. (As noted earlier, in some embodiments frozen image object model 300 may include object types that can be used to represent sub-tasks and/or their parent frozen image operations. Such objects may be used by frozen image server 230 within server object cache 235 and frozen image database 260.)

When a frozen image agent 210A completes a sub-task, it may notify frozen image server 230. If sub-tasks for the parent frozen image operation remain, frozen image server 230 may then send one or more subsequent sub-tasks to frozen image agent 210A or to another frozen image agent 210B. For example, in the embodiment illustrated in FIG. 9, when frozen image server 230 receives a notification from frozen image server 210A that sub-task 1 has completed, it may send sub-task 2 to frozen image agent 210A. When a notification indicating completion of sub-task 2 is received, frozen image server 230 may send sub-task 3 to frozen image agent 210A, and in some implementations may concurrently send sub-task 4 to frozen image agent 210B. When all the sub-tasks for the requested frozen image operation are completed (decision block 840 of FIG. 8), frozen image server may send a notification to frozen image consumer 250, indicating that the frozen image operation has completed successfully (block 845). Frozen image consumer 250 may then either close the session (e.g., using the CloseSession( ) API described earlier) or send a request for another frozen image operation within the same session (decision block 850). If frozen image server 230 receives a request to close the session, it may release the locks acquired earlier (block 860) and wait for a new session to be opened (block 865). If the session is not closed, frozen image server 230 may wait for another request for a frozen image operation (block 855). It is noted that in some implementations, frozen image server 230 may be configured to expire or close sessions automatically, instead of waiting for an explicit request to close a session. For example, a session may be closed after a specified period during which no new frozen image operation is requested. In addition, in some embodiments, a subset of locks acquired during a session may be released as soon as a corresponding frozen image operation or sub-task is completed, rather than being held until the session is closed.

In addition to providing coordination services during the creation of a frozen image as described above, frozen image server 230 may also support various lifecycle management functions for frozen images: for example, how long a frozen image is retained, how it is shared among different frozen image consumers 250, how the creation of multiple frozen images from the same source storage hierarchy 101 according to a schedule may be automated, etc. Various frozen image management policies may be implemented at a frozen image server 230 in order to provide such functionality, such as a retention policy, a scheduling policy, a quota policy, a privacy policy, and a sharing policy.

As the number of frozen images within a given storage environment grows, more and more disk space (or space within other physical storage devices) may be devoted to the storage of the frozen images. In addition to the space used for application data (e.g., transaction data from a database management application), space used for frozen image metadata (such as frozen image objects represented within frozen image database 260) may also increase over time. In order to manage the amount of storage consumed by frozen images, a frozen image retention policy and/or a frozen image quota policy may be used. A frozen image retention policy may establish rules for how long a given frozen image may be maintained at a specified type of physical storage device (such as a high-speed disk array). For example, in one embodiment, a retention policy may require that frozen images more than six months old must be removed from a high-speed storage device. Frozen image server 230 may be configured to retain frozen image ownership information (e.g., an identifier for a frozen image consumer 250 that requested the creation of the frozen image), and to periodically scan the system-level storage hierarchy catalog for frozen images whose age may be about to reach the limit specified in the retention policy. The owners of such frozen images may be notified by frozen image server 230 that the retention period is about to expire. The notified owners may take one or more actions based on the notifications, e.g., they may delete the old frozen images or request that the frozen images be archived using tapes or other archival storage media. In some embodiments, if no action is taken by a notified owner of a frozen image whose retention period has expired, frozen image server 230 may be configured to automatically delete the frozen images (e.g., by removing metadata for the frozen images from frozen image database 260 and/or by freeing storage used for the frozen images) or to automatically archive the frozen images.

A frozen image quota policy may be used in some embodiments to limit the amount of storage used for frozen images by a given frozen image consumer 250. Quotas or maximum storage space limits may be set on a per-user, per-group, or per-application level. For example, in one embodiment a quota of 100 gigabytes (GB) may be set as the maximum amount of storage space that may be allocated for frozen images requested by a given frozen image application. Quota policies and retention policies may both be used within a given storage environment. When a request to create a new frozen image is received by frozen image server 230, it may verify that the quota or quotas set for the requesting entity or entities (e.g., user, group or application) have not been exceeded before initiating the creation of the new frozen image.

Certain frozen image consumers 250 may desire that a series of frozen images of a given source storage hierarchy 101 be created according to a specified schedule. For example, in a software development environment, updates made to a source code repository may be backed up by creating a new frozen image of the repository data once every day. In some embodiments, frozen image server 230 may support a frozen image scheduling policy to allow such periodic frozen image creation operations. An interface (e.g., a GUI, an API such as ScheduleFrozenImages( ), or via configuration files) may be provided to allow frozen image consumers to specify the source storage hierarchies 101, the desired frozen image creation schedule, the target storage hierarchies and/or hosts 201. As noted earlier, objects may be instantiated within frozen image object model 300 to represent frozen image management policies such as scheduling policies, and representations of the policies may also be made persistent using frozen image database 260.

The sharing of frozen images may be facilitated using a frozen image sharing policy implemented at a frozen image server 230 in one embodiment. By allowing frozen image consumers 250 to access system-level storage hierarchy catalog 240, the creation of redundant frozen images may be avoided. For example, in some enterprises two or more frozen image consumers (e.g., from two different business units or departments) may need access to frozen images of certain transactional data for different purposes, such as to create summaries of daily sales and to perform data mining analysis to guide future product distribution. If a first frozen image consumer 250A creates a frozen image F1 of the transactional data, and information about F1 is then disseminated by frozen image server 230 to another potential frozen image consumer 250B, consumer 250B may be able to re-use F1 instead of creating a second frozen image. A frozen image sharing policy may include provisions for indicating the shared status of a given frozen image (e.g., to prevent a deletion of a shared frozen image F1 while it is still in use by a frozen image consumer 250), for associating access permissions with frozen images (e.g., some frozen images may be modifiable while others may not, some may be used as sources for further frozen images while others may not), etc. A frozen image privacy policy may be used in some embodiments to ensure that access to private data within storage hierarchies 101 is restricted (for example using restrictive access permissions), and/or to ensure that users of the frozen image services are provided mechanisms allowing them to protect private data as desired.

Communication between frozen image agents 210 and frozen image servers 230, and between frozen image servers 230 and frozen image consumers 250, may be implemented using any appropriate hardware-vendor-independent and operating-system-independent communication protocol or standard. For example, in one embodiment, an open standard such as the Common Object Request Broker Architecture (CORBA®) from Object Management Group (OMG) may be used as the underlying communication infrastructure. Security policies, including authentication and authorization policies, may be implemented at or by frozen image server 230 to ensure that only trusted frozen image agents 210 and trusted frozen image consumers 250 may participate in frozen image operations. For example, only a subset of system-level storage hierarchy catalog may be made accessible to a given frozen image consumer 250, based on the specific authorization (e.g., roles and/or capabilities) previously granted to the consumer.

In some embodiments, a cluster of hosts 201 may be utilized to support high availability for frozen image server 230. That is, frozen image server 230 may run on a first node 201K of a cluster, and frozen image server functionality may be failed over to another node 201L of the cluster in the event of a failure of node 201K. In such embodiments, after such a failover, frozen image server 230 may be configured to send a failover notification to frozen image agents 210, or to otherwise reestablish connectivity to frozen image agents 210 and frozen image consumers 250. A frozen image server may be configured to periodically monitor the state of each frozen image agent 210 (e.g., by sending a message every five minutes to a frozen image agent and waiting for an acknowledgment), and to restart a frozen image agent if needed. In some embodiments, frozen image server 230 may also verify the status of a frozen image agent prior to issuing a sub-task request. Frozen image database 260 may also be configured for high availability, e.g., in one embodiment, frozen image database 260 may also be configured to run at a node of a cluster and to fail over to another node in the event of a failure.

In one embodiment, multiple frozen image servers 230 may be deployed, e.g., a frozen image server 230 may be deployed at more than one host at the same time. Such frozen image servers may cooperate with each other, e.g., by exchanging pertinent information such as lists of known source and target storage hierarchies, frozen image relationships, and the like.

In some embodiments, a decentralized frozen image service may be employed, where functions provided by a frozen image agent (such as discovery and sub-task execution) may be partly or fully combined with functionality of a frozen image server (such as aggregation of frozen image information and coordination of multi-host frozen image operations) at one or more hosts 201, e.g., in the form of a decentralized frozen image server at each such host. The decentralized frozen image server may be configurable to perform discovery operations, as well as sub-tasks on behalf of other decentralized frozen image servers. Each decentralized frozen image server in such an embodiment may be configured to communicate with other decentralized frozen image servers to exchange frozen image information as needed, using any desired communication mechanism such as message-oriented middleware (MOM). In such a decentralized service, information on storage hierarchy frozen image relationships may be automatically distributed or replicated among a set of hosts 201 whose storage devices may be involved in the relationships, for example according to a frozen image information distribution policy. Frozen image operations, such as frozen image creations, may be initiated from a decentralized frozen image server any host, and coordinated by the initiating decentralized frozen image server. Queries for frozen image information (e.g., queries to locate source and target storage hierarchies, or to identify potential frozen image methods) may be sent to multiple hosts, and responses received (e.g., using the message oriented middleware) from each host. Such a decentralized service may be more tolerant to node failures than one employing a central frozen image server.

A frozen image consumer 250 may be any type of device capable of interacting with a given frozen image server 230 for frozen image operations. For example, in one embodiment a frozen image consumer 250 may be a server computer system, including one or more processors and one or more system memories, where the server system is configured to execute software such as one or more operating systems and/or frozen image applications. In another embodiment, a frozen image consumer 250 may be a client computer system configured to access frozen images via a separate server computer system. In other embodiments, a frozen image consumer 250 may be an embedded system configured to use application specific integrated circuit (ASIC) or field-programmable gate array (FPGA) technology to execute operations whereby a frozen image may be accessed or manipulated.

In general, a frozen image server 230 may be any device or software module capable of providing frozen image server functionality as described above, and a frozen image agent 210 may be any device or software capable of providing the frozen image agent functionality described above. In some embodiments a frozen image server 230 and a frozen image agent 210 may be co-located within the same server. Numerous other configurations of frozen image servers 230, frozen image clients 210, and frozen image consumers 250 are possible and contemplated.

Figure 10:
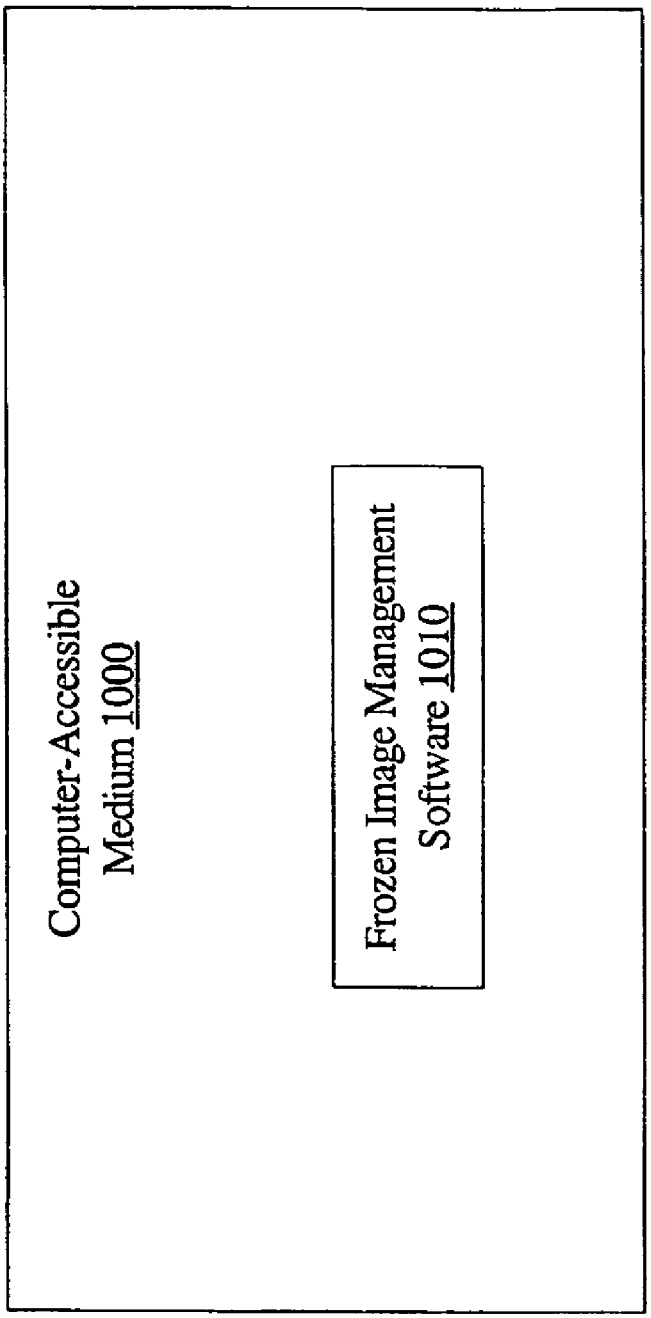
FIG. 10 is a block diagram illustrating a computer-accessible medium.

FIG. 10 shows one embodiment of a computer-accessible medium 1000 comprising frozen image management software instructions 1010 which, when executed, accomplish the functionality of frozen image server 230, frozen image agent 210, and frozen image consumer 250 described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a server system comprising a processor and memory, wherein the server system is configured to receive a plurality of encodings from a plurality of different host computers, wherein each of said plurality of encodings was received from a corresponding host computer, and wherein each of said plurality of encodings describes:
the structure of at least two storage hierarchies on said corresponding host computer, wherein each storage hierarchy comprises a file system and/or storage volume; and
one or more relationships between said at least two storage hierarchies;
wherein said server system is configured to store said received plurality of encodings in a storage hierarchy catalog, and wherein said storage hierarchy catalog includes a first encoding corresponding to a first plurality of storage hierarchies on a first host computer; and
wherein said server system is configured to use said stored first encoding to respond to a first request to create and store a first frozen image of at least one of said first plurality of storage hierarchies, wherein said first frozen image is a logical copy of data within said at least one of said first plurality of storage hierarchies, and wherein said first frozen image includes information indicative of the one or more relationships described by said first encoding.

2. The system of claim 1, wherein said server system is configured to respond to said first request to create the first frozen image by sending a second request to the first host computer to create the first frozen image, wherein said second request specifies a target location for the first frozen image.

3. The system of claim 1, wherein said server system is configured to display at least a portion of the storage hierarchy catalog, including at least a portion of a representation of the first frozen image on a display device.

4. The system of claim 1, wherein each of said first plurality of storage hierarchies includes information describing the logical and physical structure of at least a portion of a corresponding storage volume.

5. The system of claim 1, further including the first host computer, wherein said first host computer is configured to:
identify the first plurality of storage hierarchies configured on the first host computer, wherein the first plurality of storage hierarchies includes a first storage hierarchy and a second storage hierarchy;
create the first encoding, wherein the first encoding includes information indicative of a first relationship between the first storage hierarchy and the second storage hierarchy; and
send the first encoding to the server system.

6. The system of claim 2, wherein the first host computer is configured to:
receive the second request to create the first frozen image; and
create the first frozen image.

7. The system of claim 6, wherein the server system is configured to monitor sub-tasks associated with creating the first frozen image.

8. The system of claim 6, wherein said first host computer is configured to create the first frozen image using a hardware snapshot.

9. The system of claim 6, wherein said first host computer is configured to create the first frozen image using a copy-on-write snapshot.

10. The system of claim 6, wherein said first host computer is configured to create the first frozen image using a file system cloning operation.

11. The system of claim 6, wherein said first host computer is configured to create the first frozen image using a logical volume snapshot.

12. The system of claim 1, wherein the first plurality of storage hierarchies includes a first storage hierarchy and a second storage hierarchy, wherein the first encoding includes information indicative of a first relationship between the first storage hierarchy and the second storage hierarchy.

13. The system of claim 12, wherein said first relationship is a logical parent-child relationship between said first storage hierarchy and said second storage hierarchy.

14. The system of claim 12, wherein the first encoding includes information indicative of a second relationship established by cloning file system storage nodes.

15. The system of claim 12, wherein the first encoding includes information indicative of a second relationship established by providing shared access to one or more applications.

16. A computer-accessible storage medium, including program instructions executable to:
receive a plurality of encodings from a plurality of different host computers, wherein each of said plurality of encodings was received from a corresponding host computer, and wherein each of said plurality of encodings describes:
the structure of at least two storage hierarchies on said corresponding host computer, wherein each storage hierarchy comprises a file system and/or storage volume; and
one or more relationships between said at least two storage hierarchies;
store said received plurality of encodings in a storage hierarchy catalog, wherein said storage hierarchy catalog includes a first encoding corresponding to a first plurality of storage hierarchies on a first host computer; and
use said stored first encoding to respond to a first request to create and store a first frozen image of at least one of said first plurality of storage hierarchies, wherein said first frozen image is a logical copy of data within said at least one of said first plurality of storage hierarchies, and wherein said first frozen image includes information indicative of one or more relationships described by said first encoding.

17. The storage medium of claim 16, wherein the program instructions are further executable to respond to said first request to create the first frozen image by sending a second request to the first host computer to create the first frozen image, wherein said second request specifies a target location for the first frozen image.

18. The storage medium of claim 16, wherein the program instructions are further executable to display at least a portion of the storage hierarchy catalog, including at least a portion of a representation of the first frozen image on a display device.

19. The storage medium of claim 16, wherein each of said first plurality of storage hierarchies includes information describing the logical and physical structure of at least a portion of a corresponding storage volume.

20. The storage medium of claim 16, wherein the first plurality of storage hierarchies includes a first storage hierarchy and a second storage hierarchy, wherein the first encoding includes information indicative of a first relationship between the first storage hierarchy and the second storage hierarchy.

21. The storage medium of claim 20, wherein said first relationship is a logical parent-child relationship between said first storage hierarchy and said second storage hierarchy.

22. The storage medium of claim 20, wherein the first encoding includes information indicative of a second relationship established by cloning file system storage nodes.

23. The storage medium of claim 20, wherein the first encoding includes information indicative of a second relationship established by providing shared access to one or more applications.

* * * * *